United States Patent
Barnawi

(10) Patent No.: US 11,358,687 B1
(45) Date of Patent: Jun. 14, 2022

(54) DISTRIBUTED ACOUSTIC ANTI UNMANNED BOAT SYSTEM

(71) Applicant: King Abdulaziz University, Jeddah (SA)

(72) Inventor: Ahmed Barnawi, Jeddah (SA)

(73) Assignee: King Abdulaziz University, Jeddah (SA)

( * ) Notice: Subject to any disclaimer, the term of this patent is extended or adjusted under 35 U.S.C. 154(b) by 0 days.

(21) Appl. No.: 17/545,540

(22) Filed: Dec. 8, 2021

(51) Int. Cl.
| | | |
|---|---|---|
| *B63B 79/10* | (2020.01) | |
| *G01S 7/52* | (2006.01) | |
| *G01S 15/46* | (2006.01) | |
| *G01S 15/58* | (2006.01) | |
| *G01S 15/62* | (2006.01) | |
| *G01S 15/87* | (2006.01) | |
| *B63B 22/02* | (2006.01) | |
| *B64B 1/40* | (2006.01) | |
| *B64B 1/66* | (2006.01) | |
| *B63B 35/00* | (2020.01) | |

(52) U.S. Cl.
CPC .............. *B63B 79/10* (2020.01); *B63B 22/02* (2013.01); *B63B 35/00* (2013.01); *B64B 1/40* (2013.01); *B64B 1/66* (2013.01); *G01S 7/52003* (2013.01); *G01S 7/52004* (2013.01); *G01S 15/46* (2013.01); *G01S 15/586* (2013.01); *G01S 15/62* (2013.01); *G01S 15/878* (2013.01); *B63B 2035/006* (2013.01); *G01S 2015/465* (2013.01)

(58) Field of Classification Search
CPC ......... B63B 79/10; B63B 22/02; B63B 35/00; B63B 2035/006; B64B 1/40; B64B 1/66; G01S 7/52003; G01S 7/52004; G01S 15/46; G01S 15/586; G01S 15/62; G01S 15/878; G01S 2015/465

See application file for complete search history.

(56) References Cited

U.S. PATENT DOCUMENTS

| | | |
|---|---|---|
| 6,288,973 B1 | 9/2001 | Joynes |
| H2254 H * | 6/2011 | Hebert .................... B63B 35/00 114/259 |
| 8,416,123 B1 | 4/2013 | Mitchell et al. |
| 8,971,911 B2 * | 3/2015 | Barnawi ............. H04L 27/0006 455/448 |

(Continued)

*Primary Examiner* — Daniel Pihulic
(74) *Attorney, Agent, or Firm* — Oblon, McClelland, Maier & Neustadt, L.L.P.

(57) ABSTRACT

A distributed acoustic anti-unmanned boat intelligence system (DAAUBS) for detecting unmanned boats (UB) approaching protected sites includes a plurality of airborne defense agents (ADAs) and a base station. Each ADA is equipped with air balloons, tethers, buoys, a directional microphone array, a first computing device, and a transceiver. The first computing device causes at least processor to determine information regarding each approaching UB. The base station includes a control center configured with a wideband communications link configured to communicate with the transceiver of each ADA. The DAAUBS control center includes a second computing device performing an intelligence method. The second processor receives and aggregates the data of each approaching UB and performs adaptive noise cancellation to remove environmental background noise. The second processor uses a deep learning classifier to classify at least one of a type and size of the UB.

20 Claims, 16 Drawing Sheets

(56) References Cited

U.S. PATENT DOCUMENTS

| | | | |
|---|---|---|---|
| 10,819,386 B1* | 10/2020 | Barnawi | ................. H04B 1/713 |
| 10,840,969 B1* | 11/2020 | Barnawi | .................. H04B 1/04 |
| 11,073,362 B1* | 7/2021 | Barnawi | ............... G06N 20/00 |
| 11,115,077 B1* | 9/2021 | Barnawi | ................ H01Q 23/00 |
| 11,118,870 B1* | 9/2021 | Barnawi | ................ F41H 11/02 |
| 11,239,879 B1* | 2/2022 | Barnawi | ................ H01Q 23/00 |
| 2005/0271221 A1 | 12/2005 | Cerwin | |
| 2009/0040985 A1* | 2/2009 | Barnawi | ............. H04B 7/2681 |
| | | | 370/336 |
| 2011/0263208 A1* | 10/2011 | Barnawi | ............. H04B 17/345 |
| | | | 455/67.11 |
| 2012/0294333 A1* | 11/2012 | Barnawi | ............. H04B 17/345 |
| | | | 375/139 |
| 2013/0172030 A1* | 7/2013 | Barnawi | ................ H04B 15/00 |
| | | | 455/501 |
| 2022/0038134 A1* | 2/2022 | Barnawi | ................. H04B 1/69 |
| 2022/0057177 A1* | 2/2022 | Barnawi | ................ F41H 11/02 |

* cited by examiner

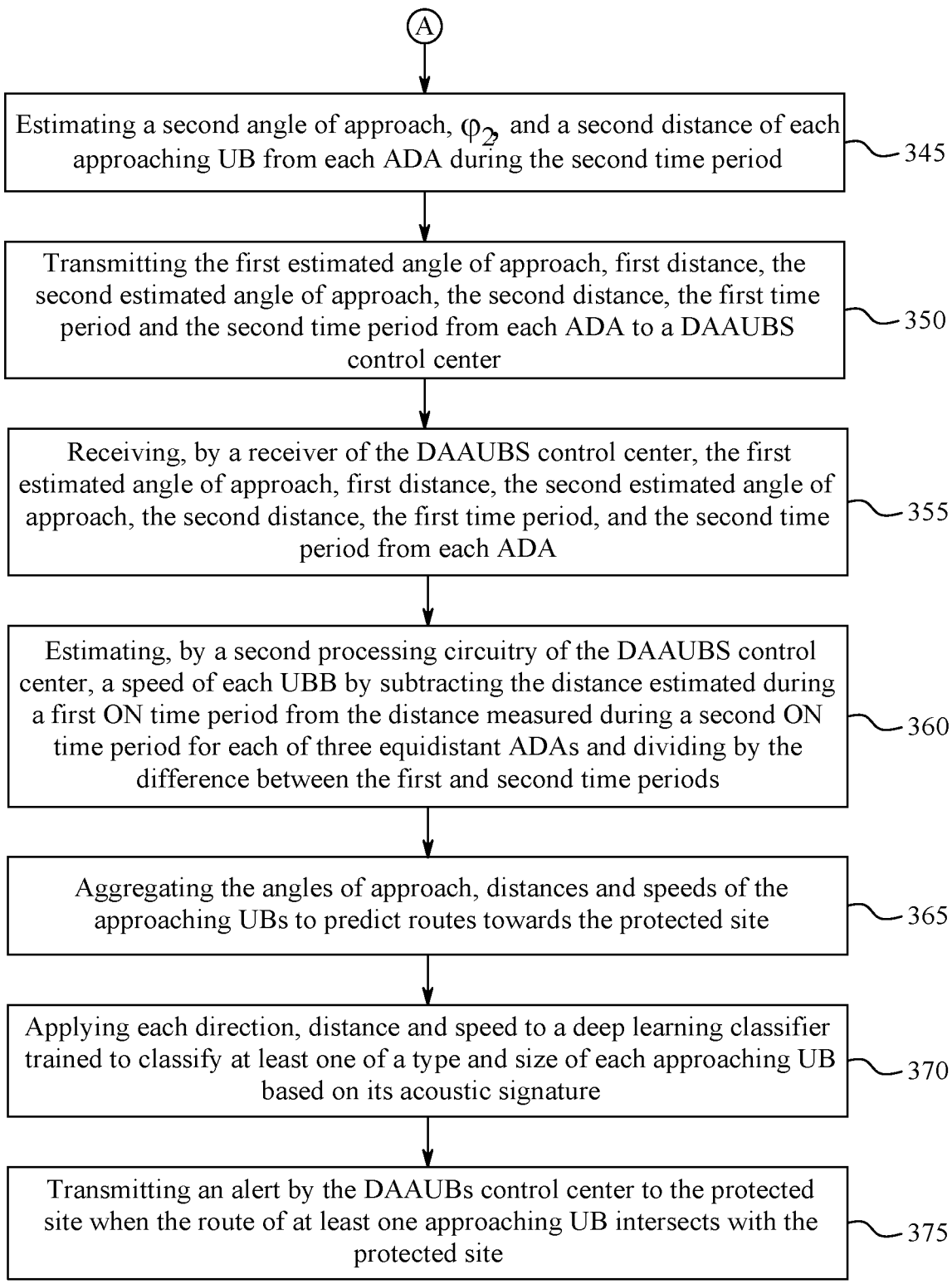
FIG. 3 (Cont,d)

DISTRIBUTED ACOUSTIC ANTI UNMANNED BOAT SYSTEM

STATEMENT OF ACKNOWLEDGEMENT

The inventor(s) acknowledge the technical and financial support from the Ministry of Education and King Abdelaziz University, Jeddah, Saudi Arabia and funding provided by Institutional Fund Projects under grant no (IFPNC-001-611-2020). The inventor(s) acknowledge the support of the Knowledge Economy and Technology Transfer center and Deanship of Research at KAU.

CROSS REFERENCE TO RELATED APPLICATIONS

The present application is related to U.S. application Ser. No. 17/398,067, entitled "Blimp-Based Aerial UAV Defense System" filed on Aug. 10, 2021, which is pending; U.S. application Ser. No. 17/234,852, entitled "Blimp-Deployed Anti-Drone System", filed on Apr. 20, 2021, now U.S. Pat. No. 11,118,870; and U.S. application Ser. No. 17/001,071, entitled "Distributed Airborne Acoustic Anti Drone System (DAAADS)", filed on Aug. 24, 2020, now U.S. Pat. No. 11,073,362, each incorporated herein by reference in its entirety.

BACKGROUND

Technical Field

The present disclosure is directed to threat detection and more specifically to methods and systems for detecting threats presented from unmanned, marine-based vehicles.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

One of the unfortunate realities in the recent proliferation of affordable, unmanned vehicular technologies is the ease with which those vehicles can be abused and/or converted into destructive weapons. As an example, unmanned aerial vehicles (UAVs) have been employed by terrorist groups to launch airborne attacks on civilian infrastructure in acts of warfare. Adapted to other means of delivery, devastating attacks via unmanned boats have been undertaken against civilian infrastructure targets located in maritime environments, such as seaports, offshore oil rigs, and/or ships.

One difficulty in combatting this development is that readily available, inexpensive unmanned boats are challenging to detect using traditional means such as radar and/or sonar. There are several reasons further underlying this difficulty, but without limitation, factors include the challenges in generating traceable electromagnetic signatures, the costs of detection equipment, and the scale of targets that must be defended. These aspects hinder the capabilities of governments, constituent agencies, and/or law enforcement to thwart such attacks.

As found in U.S. Pat. No. 11,073,362, aerial threats have been considered. In U.S. Pat. No. 6,288,973, classification based on thresholding has been developed, but this solution is prone to false alarms, especially in noisy environments. In addition, there is no cooperative sensing as the stations are operating individually. Given this lack of coordination between stations, single-point localization has its limits.

Other airborne systems, such as those found in U.S. Patent Application 2005/0271221, fail to distribute sensing, as the localization is based on a single agent. Further still, some conventional descriptions employ RADAR-based systems, such as U.S. Pat. No. 8,416,123. In that reference, electromagnetic signals must be relied upon to detect a remote object.

Each of the aforementioned detection systems and methods suffers from one or more drawbacks hindering their adoption, such as cost, accuracy, precision, or distribution. Accordingly, it is one object of the present disclosure to provide methods and systems for utilizing the sound signature originated from attacking unmanned boats to detect the attack boat and predict attacker trajectories in order to prevent attacks on maritime infrastructure.

SUMMARY

In an exemplary embodiment, a distributed acoustic anti-unmanned boat intelligence system (DAAUBS) for detecting at least one unmanned boat (UB) approaching a protected site includes airborne defense agents (ADAs) and a base station. Each ADA is equipped with a directional microphone array, a first computing device, a transceiver, a buoy, a tether, and an air balloon. The directional microphone array is configured to detect acoustic signals emitted by a UB. The first computing device includes first circuitry and a first computer-readable medium comprising first program instructions, executable by at least one first processor, to cause the at least one first processor to determine a direction and a distance of each approaching UB from the ADA.

The base station includes a DAAUBS control center located within the base station and configured with a wideband communications link configured to communicate with the transceiver of each ADA. The DAAUBS control center includes a second computing device having a second circuitry and second computer-readable medium comprising program instructions, executable by at least one second processor, to cause the at least one second processor to perform an intelligence method. The second processor receives the direction and a distance of each approaching UB from the ADA, aggregates the directions and distances of the approaching UBs, and performs adaptive noise cancellation on the aggregated directions and distances to remove environmental background noise. The second processor also applies each direction and distance to a deep learning classifier trained to classify at least one of a type and size of the UB based on its acoustic signature, predicts a route of each approaching UB towards the protected site, and alerts the protected site of the predicted route and at least one of a type and size of each approaching UB.

In certain embodiments, the first computing device of each ADA further includes a frequency analyzer, a power meter, a synchronization circuit, and a timer connected to the power meter and configured to set a timing of the alternating sequences for switching the directional microphones ON and OFF. In certain embodiments, the first and second computing devices of the DAAUBS further include circuitry configured to transmit control signals and to switch a power of each directional microphone.

In some embodiments, the second circuitry of the second computing device includes adaptive filters configured to perform the adaptive noise cancellation. In some embodiments, the at least one first processor is configured to convert the acoustic signals from a time domain to a frequency domain, identify a set of frequency components, and estimate the distance to each approaching UB. In embodiments, the second computing device includes a database of known UBs. The deep learning classifier can be trained on the data, in certain embodiments. In some embodiments, the deep learning classifier is selected from a group including support vector machines (SVM), a random forest (RF), a machine learning Dempster-Shafer (ML-DS) algorithm, long short-term memory (LSTM) algorithms, and Restricted Boltzmann Machines. In embodiments, the machine learning processor is selected from a group including regression analysis, model-based deep reinforcement learning, model-free deep reinforcement learning, a deep neural network, a feedforward neural network, a deep belief network, a recurrent neural network, a convolutional deep neural network, other deep learning techniques, or a combination thereof.

In another exemplary embodiment, a method includes a distributed acoustic anti-unmanned boat (DAAUBS) intelligence method for detecting at least one unmanned boat (UB) approaching a protected site. The method includes tethering each of a plurality of air balloons, each supporting an airborne defense agent (ADA), to respective buoys. A directional microphone of a directional microphone array of each airborne defense agent (ADA) is switched ON and OFF during consecutive time periods.

The method continues by detecting acoustic signals generated by UBs approaching the protected site during consecutive ON periods. An amplitude, A, of each acoustic signal is measured by a first processing circuitry of each ADA during the consecutive ON periods. A directional microphone that receives an acoustic signal having the greatest amplitude is detected. The method further includes detecting an angle of arrival, $\omega$, of the acoustic signal based on the angle of the directional microphone receiving the greatest amplitude.

A first angle of approach, $\varphi_1$, and a first distance of each approaching UB from each ADA is estimated by measuring a propagation delay, $\tau$, of the acoustic signal having the greatest amplitude, during the first time period. A second angle of approach, $\varphi_2$, and a second distance of each approaching UB from each ADA is estimated during the second time period. The first estimated angle of approach, first distance, the second estimated angle of approach, the second distance, first time period and second time period are transmitted from each ADA to a DAAUBS control center.

The first estimated angle of approach, the first distance, the second estimated angle of approach, the second distance, the first time period and the second time period from each ADA is received by a receiver of the DAAUBS control center. A speed of each UB is estimated by a second processing circuitry of the DAAUBS control center. The speed of each UB is estimated by subtracting the distance estimated during a first ON time period from the distance measured during a second ON time period for each of three equidistant ADAs and dividing by the difference between the first and second time periods.

The angles of approach, distances, and speeds of the approaching UBs are aggregated to predict routes towards the protected site. Directions, distances, and speeds are applied to a deep learning classifier trained to classify at least one of a type and size of each approaching UB based on its acoustic signature. An alert is transmitted by the DAAUBS control center to the protected site when the route of at least one approaching UB intersects with the protected site.

In some embodiments, the intelligence method includes transmitting control signals from the DAAUBS control center to each ADA to control each directional microphone array based on a number of the approaching UBs and the angle of approach, $\varphi$, of each UB. In certain embodiments, the intelligence method further includes estimating the distance to an approaching UB from the ADA by converting the acoustic signals of each approaching UB from the time domain to the frequency domain. Adaptive noise cancellation is performed on the acoustic signals. A set of frequency components is identified and the distance is estimated from the set of frequency components.

In certain embodiments, the intelligence method further includes the size, type, speed, distance, and route of each approaching UB in the alert when the route is predicted to intersect with the protected site. The intelligence method further includes training the deep learning classifier to recognize a size and type of each UB by applying data including known sizes and known types of UBs, specifications regarding the known sizes and known types of the UBs, and the speed and maneuverability of each known size and known type of UB to the deep learning classifier.

In another exemplary embodiment, a non-transitory computer readable medium having instructions stored therein that, when executed by one or more processors, cause the one or more processors to perform a distributed acoustic anti-unmanned boat (DAAUB) intelligence method as described above.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
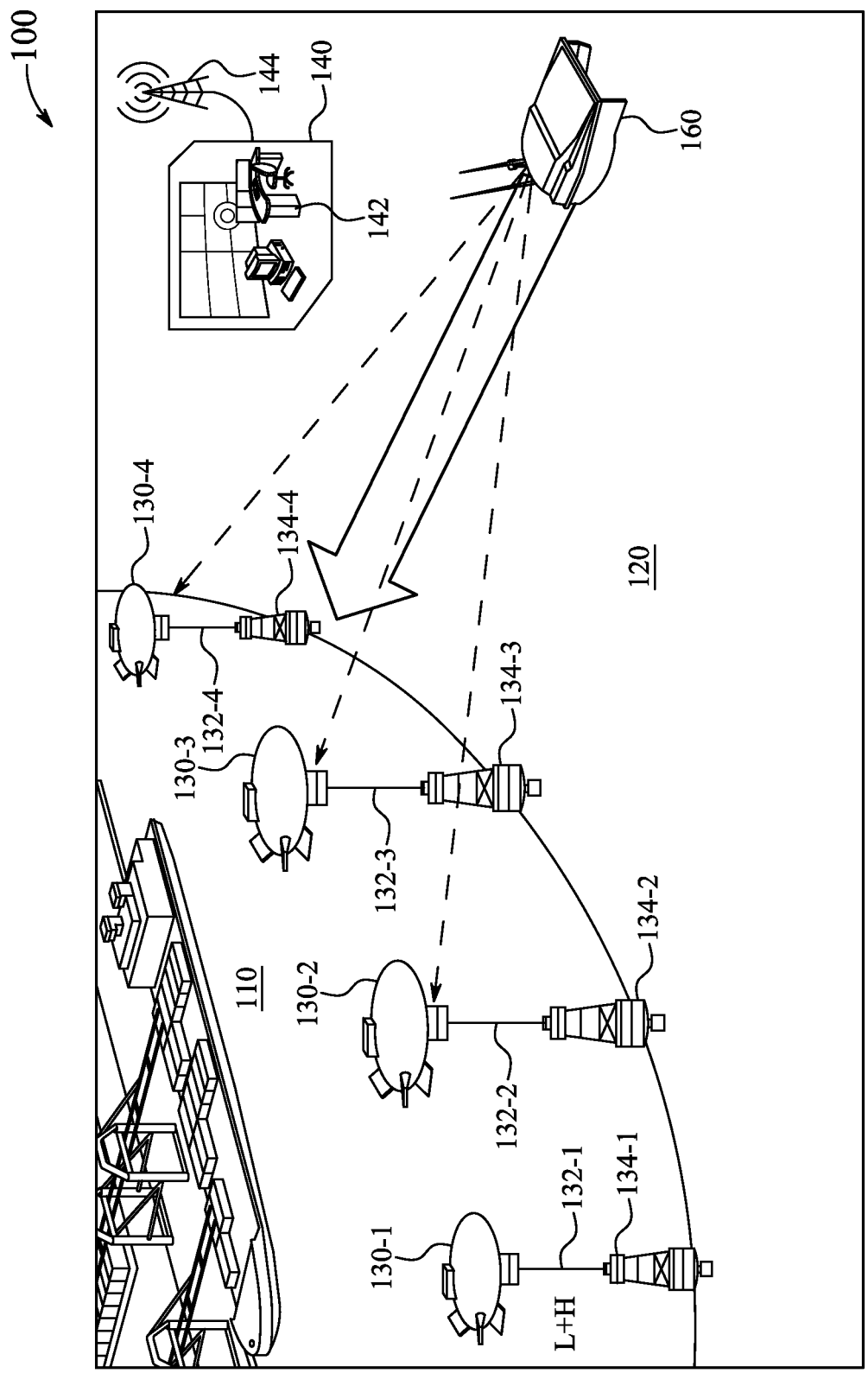
FIG. 1 is a schematic diagram of a distributed acoustic anti-unmanned boat intelligence system (DAAUBS) for detecting attacking unmanned marine vehicles, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

In the present disclosure, the phrase "unmanned boat" describes unmanned marine vehicles which travel on the water, the water and/or under the water. Boat may refer to ships, sailboats, catamarans, wind surfing boards and other on-the-water vehicles, submarines, hydro-craft, hovercraft and the like. The term hydro-craft refers to a waterproof unmanned drone which has the capability of flying over the water, travelling on the water and landing on the water. The term "unmanned" refers to drones, or vehicles which navigate by remote control or on a programmed trajectory, without a human pilot.

Unmanned boats, also referred to as drone boats, present a particular difficulty to a protected site located in the water, near a body of water, or any protected site accessible by a body of water. These unmanned boats may be able to approach the protected site without detection by ordinary radar or sonar, as they may be small (under 5 feet in diameter) and have reflective or colored skins which mimic a water surface or wave. An unmanned boat may appear to be a fish, a dolphin or other marine life. Detection of unmanned boats requires the capability of identifying the type and the capabilities of the unmanned boat. Typically an unmanned boat floats in the water with a portion under the surface of the water and a portion above the surface of the water.

An unmanned boat may include cameras which surveil the protected site. Surveillance of the protected site is considered to be a way of attacking the protected site.

Additionally, an unmanned boat may carry a payload, such as a bomb (e.g., an explosive payload), a missile (e.g., a payload that is launched from the unmanned boat), a surveillance device, a water contaminant, a biological agent or the like, which may a danger to the protected site.

The unmanned boat may be able to attack by jamming or otherwise disrupting communications. In this sense the unmanned boat may carry an electromagnetic payload or the circuitry needed to initiate a disruptive electromagnetic attack, emission or jamming event.

Therefore, it is clear that identification and trajectory analysis of an unmanned boat is necessary to secure the protected site.

Aspects of this disclosure are directed to systems, devices, and methods for unmanned boat (UB) detection and anti-UB intelligence gathering. The above and below described embodiments contribute to the prevention of malicious UB attacks on high value, maritime infrastructure sites. According to some embodiments, the system operates in two areas—a protected zone and a sensing zone. The protected zone surrounds a protected site, outside of which an attacking UB should be pre-emptively dealt with before entering. According to certain embodiments, a distributed acoustic anti-unmanned boat intelligence system (DAAUBS) can be deployed at the perimeter of the protected site. At the edge of this zone, the DAAUBS agents are deployed and spaced equally along the zone's circumference. In some embodiments, the sensing zone is the area surrounding the protected zone. In the sensing zone, intelligence regarding potential UB attackers can be gathered by airborne defense agents (ADA) in order to categorize the behavior of the threat, as well as compute the trajectory of identified vehicles using artificial intelligence-based prediction techniques.

In the present disclosure, a fully automated, dynamic, scalable, outreaching, distributed and accurately predictive system is described that can be utilized to remotely detect and predict the trajectory of the attacking UB. The DAAUBS system of the present disclosure functions by collecting and analyzing intelligence based on acoustic signals emitted by the malicious UB approaching the protected site. This is achieved by means of signal processing accompanied with advanced machine learning analysis, such as deep reinforcement learning. The system produces intelligence that helps facilitate cost-effective neutralization of such threats and reduce effects from collateral damage.

FIG. 1 depicts a distributed acoustic anti-unmanned boat intelligence system (DAAUBS) 100 for detecting unmanned boats (UBs) approaching a protected site in accordance with embodiments of the present disclosure. The DAAUBS 100 includes Airborne Defense Agents 130-1, 130-2, 130-3, and 130-4 (collectively, "the ADAs 130"), shown surrounding a protected site 110. As shown in FIG. 1, the protected site 110 may be a seaport shipping facility. In alternative embodiments, the protected site 110 may be, without limitation, a different type of seaport, an offshore platform, a ship, or a fleet of ships.

In the present disclosure, each of the ADAs 110 are designed to enable sensing at a height above the sea level, which significantly improves the sensing ability of the ADA by increasing the range of line of sight between the sensor and the approaching threat, thus improving the coverage, and by reducing the level of background noise, thus improving the accuracy of detection.

In some embodiments, each of the ADAs 110 is located at a fixed radius from the protected site 110 and equidistant from each adjacent ADA of the ADAs 130. Each of the ADAs 130 is equipped with a microphone array (shown in FIG. 2) configured to detect acoustic signals emitted by a UB when the UB enters a sensing area 120. The ADAs 130 are each respectively attached to a tether 132, which is in turn attached to a buoy 134. A more complete description of the ADAs 130 and other associated components of system 100 is given below in conjunction with FIG. 2.

Included in the protected site 110 is a base station having a control center (a BS-CC) 140 that is in communications with the ADAs 130, according to some embodiments. In some alternative embodiments, the BS-CC 140 may be located remotely from the protected site 110. The BS-CC 140 includes a computing device 142 and a wideband communications link 144 that enables signals to be transmitted from the BS-CC 140 to the ADAs 130 and vice versa. Communications between the ADAs 130 and the BS-CC 140 may be enabled via any number of wireless communications protocols including, but not limited to, Bluetooth, WiFi, 2G/3G/4G/LTE/5G cellular standards, ZigBee, NFC, RFID, and/or all variants thereof.

Also depicted in FIG. 1 is an attacking agent (AA) 160. The AA 160 is an unmanned boat (UB), or alternatively referred to as a drone or drone boat) approaching the protected site 110. In various embodiments, the AA 160 lacks authorization to be in the protected site 110 and/or may be a hostile UB having malicious intent. While a single AA/UB 160 is shown in FIG. 1, more than one AA 160 may be approaching the protected site 110 or in the sensing area 120.

Included as part of each ADA 130 is a computing device (also shown in FIG. 2) including a computer-readable medium comprising programming instructions executable by processing circuitry. Responsive to execution of the programming instructions, the processing circuitry determines a direction and a distance of the UB 160 from each ADA 130, such as by methods shown in FIG. 3 and described below. In various embodiments, the computing device includes switching circuitry configured to switch the power of each directional microphone ON and OFF in an alternating sequence. In accordance with some embodiments of the present disclosure, each directional microphone of the directional microphone array may be oriented to receive acoustic signals from a different angle.

Moreover, each computing device of each ADA 130 may include circuitry configured to measure an amplitude, A, of each acoustic signal during the alternating ON periods. Each processing circuitry of the ADAs 130 may be further configured to detect an angle of arrival, $\omega$, of the acoustic signal from the angle of the directional microphone receiving the greatest amplitude. Each processing circuitry of the ADAs 130 can then estimate the distance between each of the ADAs 130 and the AA 160 by measuring a propagation delay, $\tau$, of the acoustic signal having the greatest amplitude. Moreover, the processing circuitry may be configured to convert the acoustic signals from the time domain to the frequency domain, identify a set of frequency components, and estimate the distance to the sound source.

Figure 2:
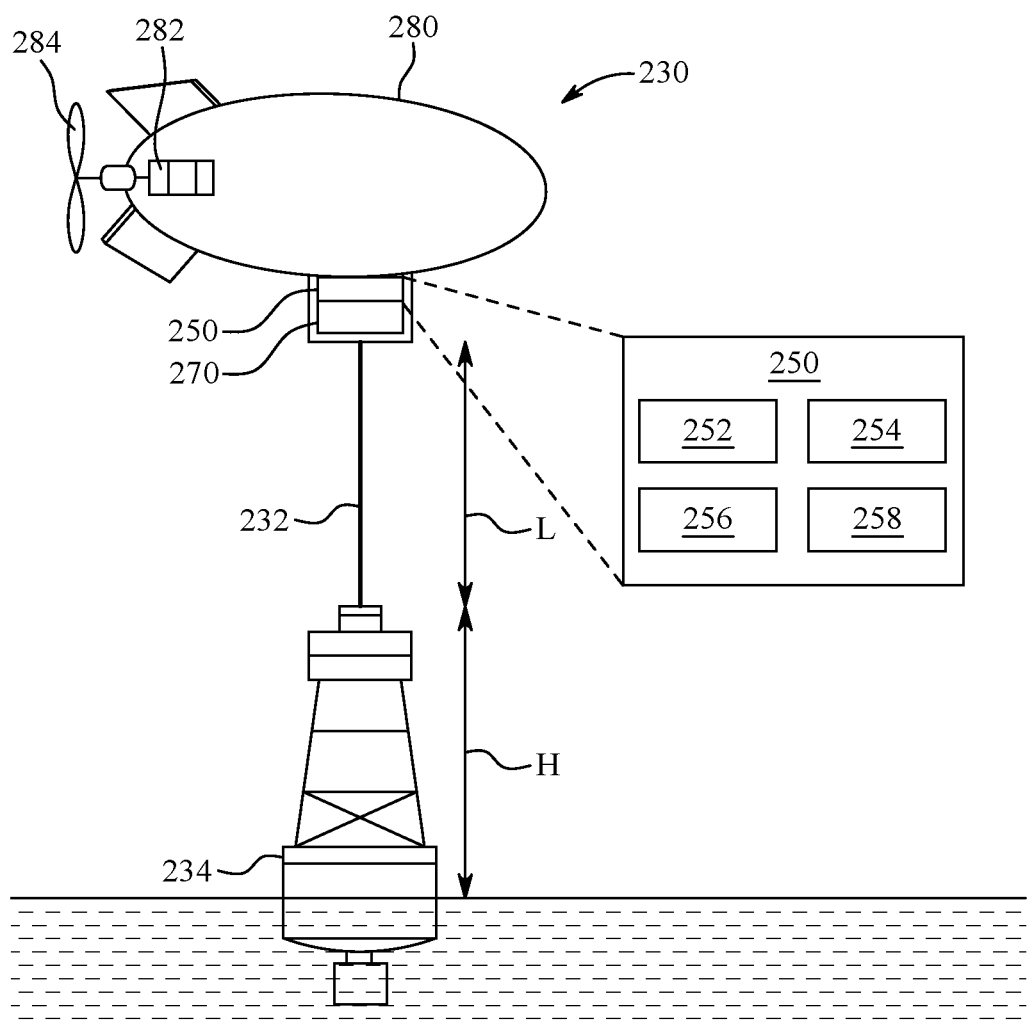
FIG. 2 illustrates an airborne defense agent (ADA) tethered to a buoy, according to certain embodiments.

Each of the ADAs 130 may also include GPS receiver circuitry along with (wireless) transceiver circuitry (both shown in FIG. 2). The GPS receiver circuitry can be configured to locate the respective ADA of the ADAs 130 in a three-dimensional space. Each of the ADAs 130 may optionally include a motor, a propeller, and navigation circuitry (also each shown in FIG. 2) configured to cause a respective ADA of the ADAs 130 to hover at a fixed height from the surface of the water, at a fixed radius from the protected site, and equidistant from each other adjacent ADA of the ADAs 130.

The BS-CC 140 of the DAAUBS 100 is configured to utilize the wideband communications link 144 to communicate with the transceiver of each of the ADAs 130. In embodiments, the BS-CC 140 may be configured to transmit position signals to the navigation circuitry included in each of the ADAs 130 to control the position of a respective ADA of the ADAs 130. As shown in FIG. 1, the BS-CC 140 may include a computing device 142 having a computer-readable medium comprising program instructions, executable by processing circuitry, to cause the processing circuitry to perform an intelligence method. In some embodiments, the computing device 142 is configured to aggregate the direction and distance of approaching AA 160 to predict routes towards the protected site 110. The computing device 142 can be configured to alert the protected site 110 of the predicted route of the AA 160 if approaching the protected site 110. The computing device 142 may be a personal computing device, a laptop, a mainframe, a server, a database, or any combination thereof.

In accordance with embodiments of the present disclosure, the processing circuitry of the BS-CC 140 may be configurable to transmit control signals to each of the ADAs 130 to switch the directional microphone arrays included therein ON and OFF simultaneously. Moreover, the computing device 142 may be further configurable to predict the route of the approaching AA 160 by triangulating the acoustic signals received by the directional microphone arrays of three equidistant ADAs of the ADAs 130. The computing device 142 may also be configured to estimate the speed of the AA 160 by subtracting the distances estimated by each of the three equidistant ADAs of the ADAs 130 at a first ON period from the distances estimated at a second ON period and dividing the difference by the time between the first ON period and the second ON period.

In some embodiments, the computing device 142 of the BS-CC 140 can be configured to perform adaptive noise cancellation on aggregated directions and distances to remove background noise. In certain embodiments, the noise cancellation performed can remove noise related to water dynamics, environmental noise, or combinations thereof. For example, the noise cancellation features can remove the sound of waves or certain common wildlife sounds. In some instances, the computing device 142 can include a plurality of adaptive filters configured to perform the adaptive noise cancellation.

Further, the computing device 142 may also include a machine learning processor configured to predict the route of the approaching AA 160 toward the protected site 110. In some embodiments, the machine learning processor uses a reinforcement deep learning algorithm to train and improve predictions. Further details of machine learning features are given below with respect to FIGS. 15 and 16. The computing device 142 may further include, or be in communication with, a database of known UBs. The database can include information of UBs regarding sound characteristics, sizes, types of propulsions systems, and the like.

FIG. 2 illustrates an ADA 230 connected to a tether 232, having length, L, according to some embodiments. The ADA 230 can be similar or substantially identical to ADAs 130 shown above in FIG. 1. The tether 232 is connected to a buoy 234 having height, H. In some embodiments, the DAAUBS 100 may include a plurality of buoys 234 of height H throughout a protected region. Each buoy 234 may be located at a fixed radius from the protected site (for example, the protected site 110) and equidistant from each other adjacent buoy. For example, the buoys may be located at the perimeter of a protected zone as described with respect to FIG. 1. A top portion of each buoy 234 is connected to a corresponding tether of a plurality of tethers 232 (e.g., ropes, chains, etc.), each tether 232 of length L.

Each ADA 230 may include an air balloon 280, each air balloon 280 having a lower mount. Each ADA 230 may be attached via the lower mount to the tether 232. Each air balloon 280 is configurable to hold critical circuitry 250 and a directional microphone array 270 of an ADA at a fixed height L+H above the water.

Also depicted in FIG. 2 and as referenced throughout the description of FIG. 1 are a motor 282 and a propeller 284. The motor 282 may drive the propeller 284 such that the ADA 230 is able to hover at a fixed height of H+L above the water. In accordance with the present disclosure, the directional microphone array 270 senses acoustic signals emitted from an approaching attacking agent (e.g., AA 160). Included in the critical circuitry 250 are a computing device 252 executing code for determining a direction and a distance of each UB approaching the ADA 230, a GPS receiver 254 configured to locate the ADA in a three-dimensional space, and transceiver circuitry 256 for sending/receiving wireless communications signals. The critical circuitry 250 may further include navigation circuitry 258. In some embodiments, the navigation circuitry 258 may include the GPS receiver 254 or may provide additional navigation capabilities.

Figure 3:
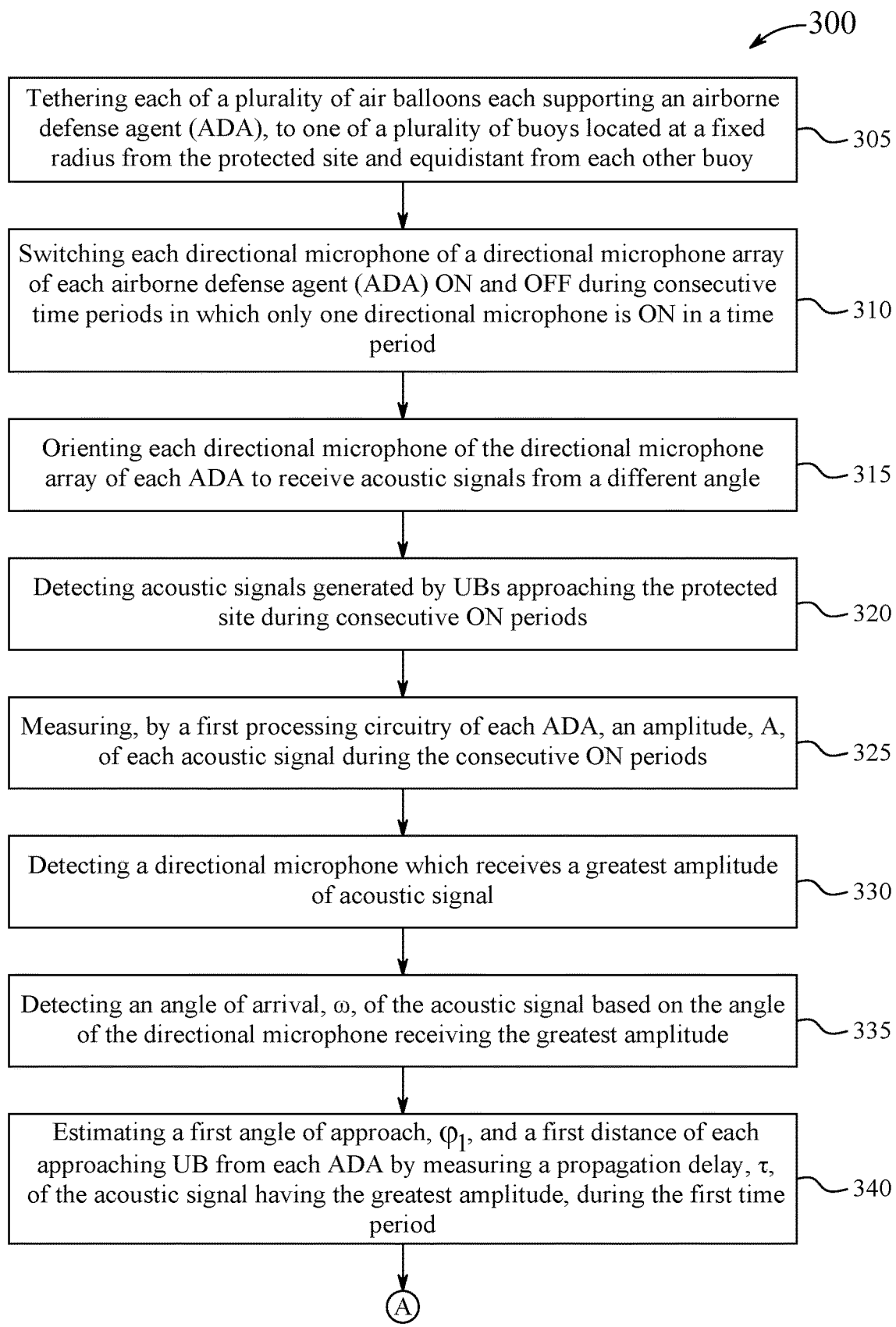
FIG. 3 is an exemplary flowchart of a distributed acoustic anti-unmanned boat intelligence method, according to certain embodiments.

Turning to FIG. 3, a flowchart representing a distributed acoustic anti-unmanned boat (DAAUBS) intelligence method 300 for detecting at least one unmanned boat (UB) approaching a protected site is shown according to embodiments of the disclosure. In some embodiments, the intelligence method 300 can be implemented using some or all of the components of the DAAUBS 100 shown above in FIG. 1 and/or the ADA 230 shown in FIG. 2. The DAAUBS intelligence method 300 can be used to detect one, several or many UBs approaching a protected site, such as the protected site 110.

At a step 305, each of a plurality of air balloons is tethered to a corresponding buoy of a plurality of buoys. Each air balloon in the plurality supports an airborne defense agent (ADA). Each air balloon/ADA is located at a fixed radius from the protected site and equidistant from each other buoy/ADA. In some embodiments, each ADA is located at the perimeter of a protected zone surrounding the protected site.

At a step 310, each directional microphone of a directional microphone array of each airborne defense agent (ADA) is switched ON and OFF during consecutive time periods. Only one directional microphone is ON in a time period. Each directional microphone of the directional microphone array of each ADA is oriented to receive acoustic signals from a different angle during a step 315.

At a step 320, acoustic signals generated by UBs approaching the protected site are detected during consecutive ON periods. A first processing circuitry of each ADA measures an amplitude, A, of each acoustic signal during the consecutive ON periods at a step 325. A directional microphone which receives a greatest amplitude of acoustic signal is detected during a step 330. At a step 335, an angle of arrival, ω, of the acoustic signal is detected based on the angle of the directional microphone receiving the greatest amplitude detected (i.e., detected at step 330).

At a step 340, a first angle of approach, $\varphi_1$, and a first distance of each approaching UB from each ADA is estimated by measuring a propagation delay, τ, of the acoustic signal having the greatest amplitude during the first time period. A second angle of approach ($\varphi_2$) and a second distance of each approaching UB from each ADA is estimated during the second time period during a step 345. At a step 350, the first estimated angle of approach ($\varphi_1$), the first distance, the second estimated angle of approach ($\varphi_2$), the second distance, the first time period, and the second time period are transmitted from each ADA to a DAAUBS control center (e.g., the BS-CC 140).

At a step 355, the first estimated angle of approach ($\varphi_1$), the first distance, the second estimated angle of approach ($\varphi_2$), the second distance, the first time period, and the second time period from each ADA is received by a receiver of the DAAUBS control center. At a step 360, a speed of each UB is estimated by a second processing circuitry of the DAAUBS control center. The speed is estimated by subtracting the distance estimated during a first ON time period from the distance measured during a second ON time period for each of three equidistant ADAs and dividing by the difference between the first and second time periods. At a step 365 of the method 300, the angles of approach, the distances, and the speeds of the approaching UBs are aggregated to predict routes towards the protected site.

Each of the directions, the distances, and the speeds are applied to a deep learning classifier at a step 370. The deep learning classifier is trained to classify at least one of a type and size of each approaching UB based on the UB's acoustic signature. As an example, the deep learning classifier can use support vector machines. In other embodiments, the classifier is selected from a random forest (RF), a machine learning Dempster-Shafer (ML-DS) algorithm, long short-term memory (LSTM) algorithms, or Restricted Boltzmann Machines. When the route of at least one approaching UB intersects with the protected site, an alert is transmitted by the DAAUBS control center to the protected site during a step 375.

FIGS. 4-16 provide more detailed descriptions of the functionality of (e.g., the various tasks executed by) DAAUBS 100 in detecting a UB approaching a protected site. It is to be understood that there may be multiple different ways to perform these tasks in addition to what is described in FIGS. 4-11, and/or there may be multiple iterations for performing what is described. The functions described below may be used in various combinations, as part of larger processes, or in different sequences as understood by one of skill in the relevant arts.

Figure 4:
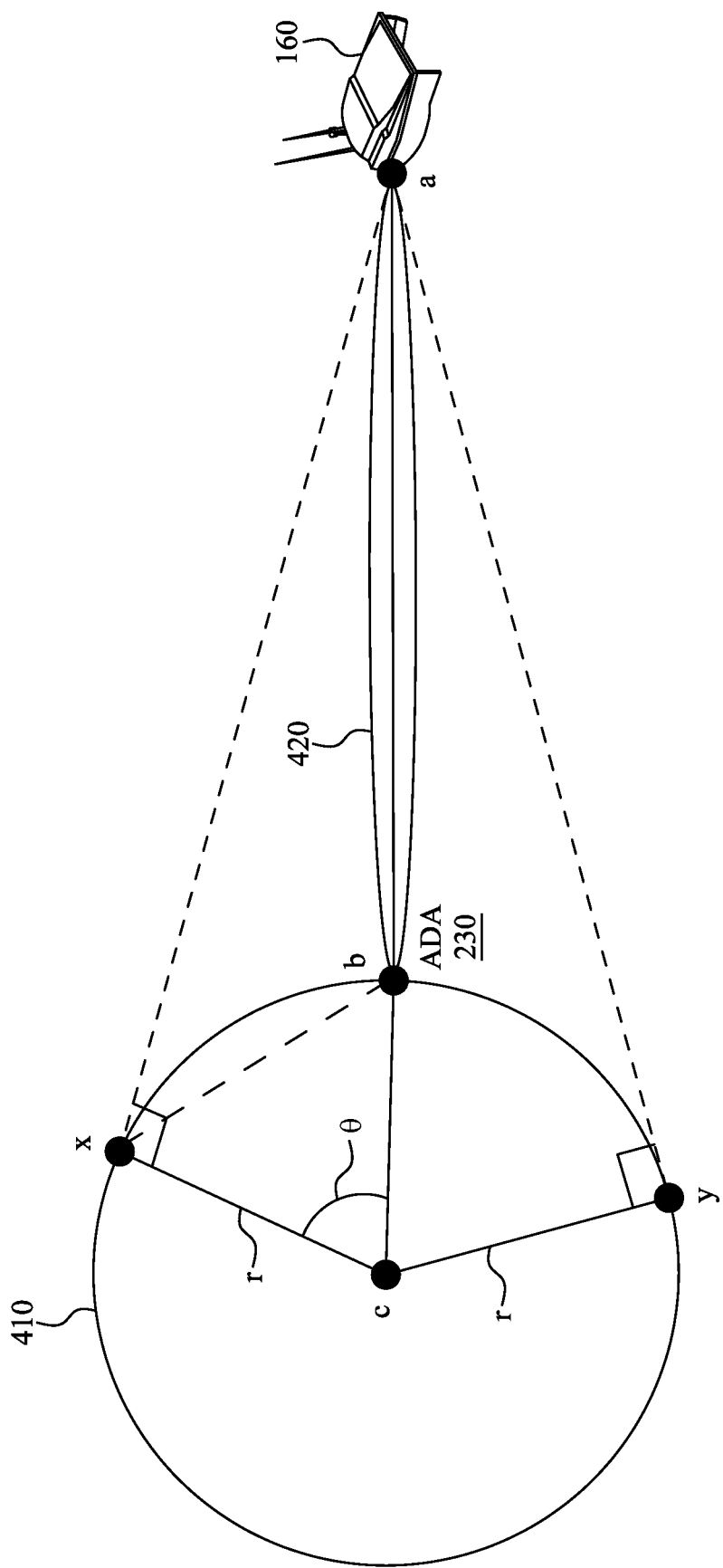
FIG. 4 illustrates a geometrical representation for processes used in predicting the direction of an incoming attack on a protected site, according to certain embodiments.

FIG. 4 illustrates one geometric representation by which DAAUBS 100 may predict the direction of an incoming attack from the attacking agent (AA) 160 approaching a protected region 410, having center, C, and radius, r, according to various embodiments. For the purposes of predicting direction of an incoming attack, points x, y, and b around the circumference of protected region 410 are of interest, as is a point a. As illustrated, an airborne defense agent (ADA) 230 is located at the point b and the AA 160 is located at the point a. A microphone pattern 420 is indicative of the acoustic signal emitted by the AA 160 at the point a and sensed by the ADA 230 at the point b. Based on the microphone pattern 420, the initial coordinate of AA 160 is estimated.

Estimating the initial position of the approaching AA 160 may initiate an early alarm, the alarm indicating that an imminent threat may be approaching the protected region 410 from a specific direction. The length of line segment ab, or the distance in a straight line between the AA 160 at the point a and the ADA 230 at the point b, may be calculated based on the propagation delay of the sound originating at the AA 160 multiplied by the speed of sound (approximately 343 m/s). In some embodiments, calculations may include mathematical compensation for disturbances in the sound waves received, such as minor adjustments for sounds likely to originate under water, travel through water, etc.

To improve estimates as to the location of the AA 160, three points around the protected region 410 may be used to triangulate the position of the AA 160. As illustrated, points x, y, and b are these three points. Initially the locations (e.g., coordinates) of the points b and a are known, and are used in determining the locations of the points x and y. First, chords to the protected region 410, one above and one below the known location the ADA 230 (e.g., the point b) passing through the known location of the AA 160 (e.g., the point a), are taken. The intersections of these chord lines with the protected region 410 are the points x and y. Additionally and/or alternatively, by approximating θ≈60°, the coordinates of x and y can be approximated. After establishing the three fixed points, x, y, and b, it is possible to estimate the coordinates of the attack in a three-dimensional space via triangulation using the edges of the right triangles (e.g., ΔCXA and ΔCYA).

Figure 5:
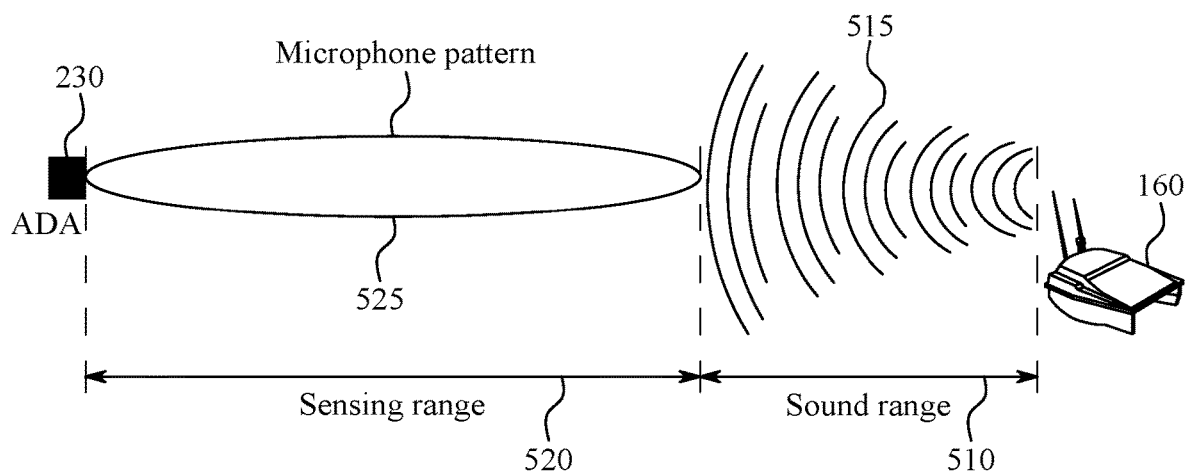
FIG. 5 is an exemplary illustration of an acoustic signal emitted by an approaching attacker, as detected by an airborne defense agent, according to certain embodiments.

FIG. 5 illustrates sound components involved in the ADA 230 sensing/detecting the approaching AA 160, according to various embodiments. In a sound range 510, the approaching AA 160 emits sound waves 515. In a sensing range 520, the ADA 230 has a microphone pattern 525 within which sound waves will be detectable by the array of microphones in the ADA 230. In some embodiments, the microphone pattern 525 may be substantially similar/identical to the microphone pattern 420 shown above in FIG. 4. The AA 160 can be detected by sounds generated (e.g., by its motor, propeller, other mechanical features, water displacement by its body, etc.), which serve as the origin of the sound waves 515 that traverse the sound range 510 shown in FIG. 5. The ADA 230 has a sensing range corresponding to the microphone pattern 525 in which incoming sounds can be sensed.

Figure 6:
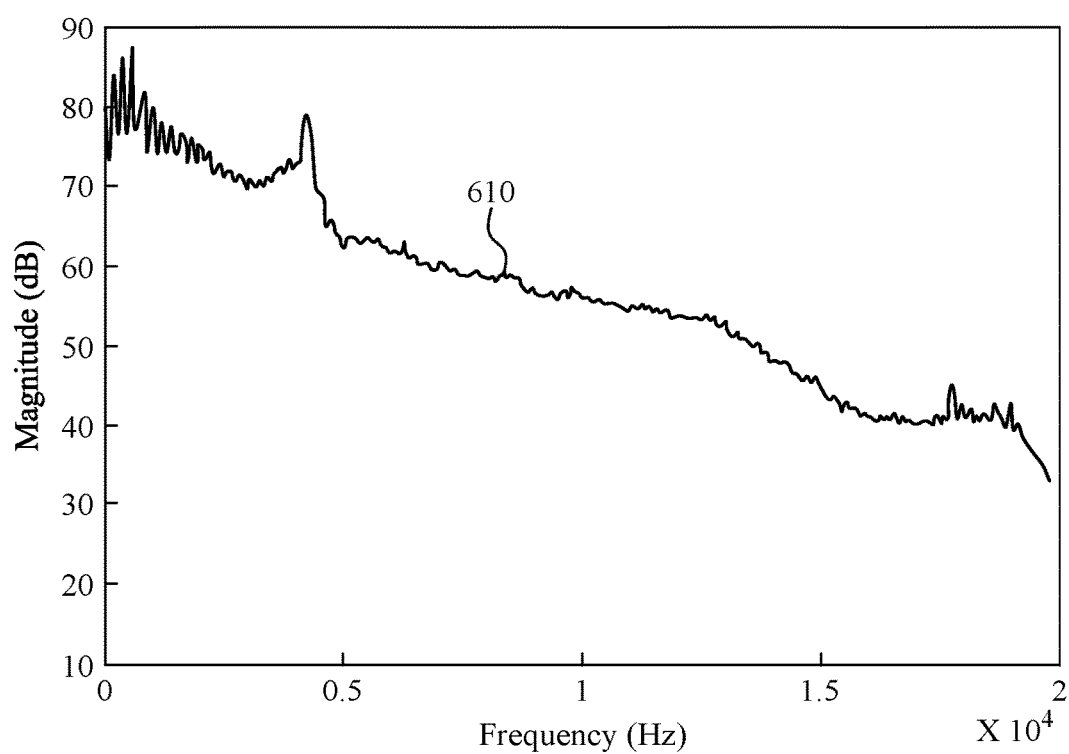
FIG. 6 is a graph representing a UB sound profile, according to certain embodiments.

As the sound waves 515 cross into the microphone pattern 525, the frequency spectrum of the sound waves 515 can be analyzed. Tracking the AA 160 with the highest possible accuracy results from tracking the sound components of the AA 160 with the highest frequency possible, because lower frequency components propagate away at a faster rate than the higher frequency components (i.e., because lower frequency components have longer wavelengths). Graph 600 of FIG. 6 shows a UB sound profile 610 with measured spectrum characteristics of an example UB. As shown in the graph 600, the UB emits sounds having acoustic components across a frequency spectrum that can be analyzed in terms of sensing.

As an example, it is possible that low frequency components of a UB's sound waves may travel ahead of the originating source (i.e., the UB) a distance of 343 meters when calculated for a frequency of 1 Hz. The highest frequency components of the same UB may travel ahead of the origin only 0.01715 m for sound waves calculated at a frequency of 20 kHz. Therefore, the DAAUB S 100 converts the received signal from a time domain to a frequency domain to identify the frequency component of the received portion before estimating an exact distance to the sound source, according to some embodiments. The ADA 230 may transmit data collected about the sound waves 515 to a BS-CC substantially similar/identical to the BS-CCs described above (e.g., BS-CC 140) for analysis.

Figure 7:
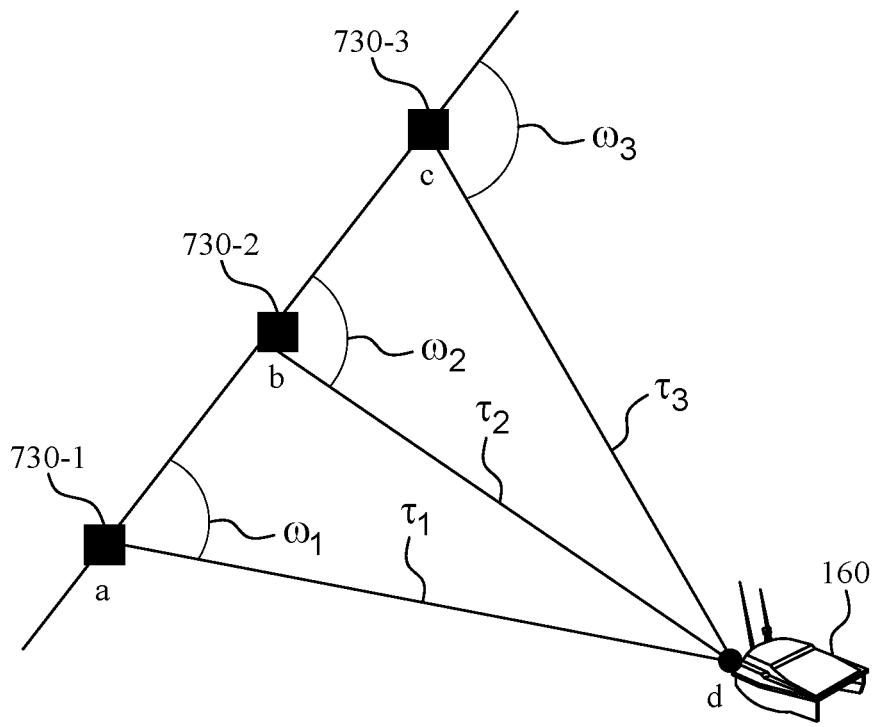
FIG. 7 illustrates position triangulation of an attacking agent by airborne defense agents (ADAs), according to certain embodiments.

FIG. 7 provides further detail on the localization/triangulation of an AA approaching a protected site by three ADAs, according to some embodiments. Three ADAs, 730-1, 730-2, and 730-3 (collectively "the ADAs 730") are shown detecting the approaching AA 160. To triangulate the position of the AA 160 (e.g., find the coordinates of the AA 160 in a three-dimensional space), the ADAs 730 sense acoustic signals emitted by the AA 160. Responsive to sensing the acoustic signals, each ADA of the ADAs 730 establishes a relative location by determining a propagation delay ($\tau$) and angle of arrival ($\omega$) of the sensed acoustic signals using the array of directional microphones included in each respective ADA of the ADAs 730. Propagation delays are measured while angles of arrivals are estimated.

FIG. 7 illustrates each respective ADA of the ADAs 730 having a measured propagation delay and an estimated angle of arrival of the sensed acoustic signal emitted from the attacking agent (AA) 160. For example, the ADA 730-1, located at a point a, uses the acoustic signal(s) emitted from the AA 160 to measure a propagation delay $\tau_1$ and to estimate an angle of arrival $\omega_1$ of the AA 160. Similarly, the ADA 730-2, located at a point b, measures a propagation delay ($\tau_2$) and estimates an angle of arrival ($\omega_r$) of the acoustic signals emitted from the AA 160, and the ADA 730-3, located at a point c, measures a propagation delay ($\tau_3$) and estimates an angle of arrival ($\omega_3$) of the acoustic signals emitted from the AA 160. A combination of these measurements and estimations may be used to triangulate the position of the AA 160 during approach. Lengths of the sides of the triangles Δabd and Δbcd formed between the ADAs 730 and the AA 160 (e.g., the line segments ad, bd, and cd) may be used to calculate the position of the AA 160 in a three-dimensional space.

FIG. 7 depicts three ADAs (730-1, 730-2, and 730-3) triangulating the position of the AA 160 as the AA 160 traverses a distance x, in accordance with the present disclosure. However, it is possible to triangulate the position of the AA 160 with four, five, ten or more ADA depending on various factors, including but not limited to the trajectory of the approaching AA and the formation of the ADA. Provided there are no restrictions/limitations caused by system overhead (e.g., insufficient bandwidth), all ADA included in the DAAUBS 100 may track an approaching AA at once. In general, the more ADA that are triangulating the position of an approaching AA, the more accurate the results will be.

Figure 8:
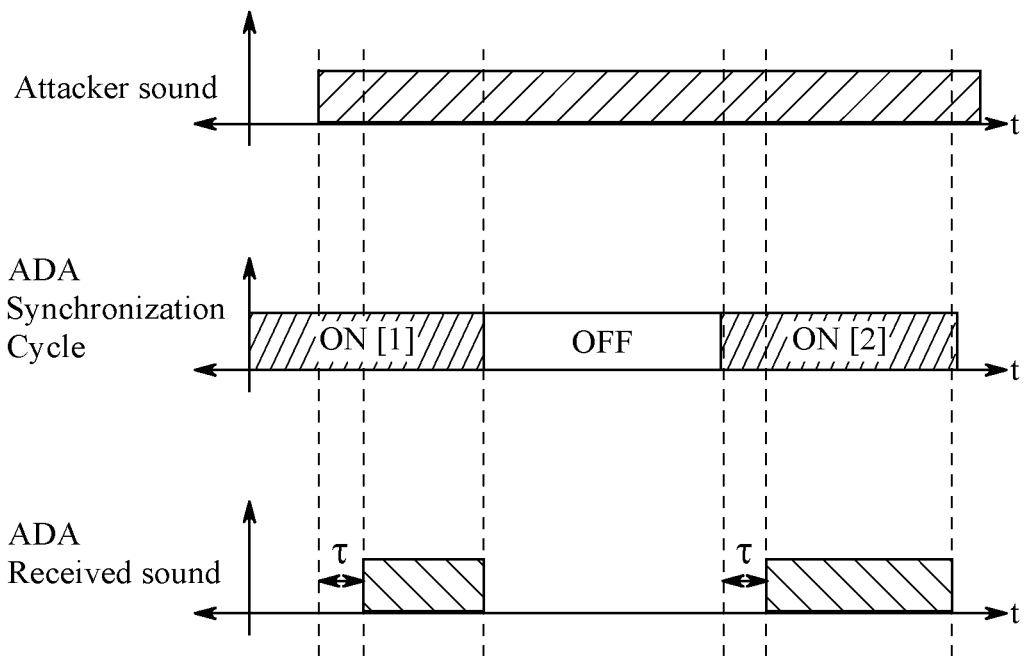
FIG. 8 illustrates measurement of a propagation delay of an acoustic signal emitted by an attacking agent, according to certain embodiments.

FIG. 8 illustrates measurement of propagation delay, or the time required for a sound to travel from the source/origin of the sound to a location/object sensing that sound, according to some embodiments. In accordance with the present disclosure, an attacking agent emitting acoustic signals serves as the source/origin and an ADA sensing acoustic signals emitted from an attacking agent serves as the sensing object. Synchronizing ADAs, such as the ADAs 730-1 to 730-3, to a reference channel enables the ADAs 730 to listen to the same acoustic signals at the same time, enabling propagation delay, r, to be measured. Propagation delay may be measured by switching ON and OFF microphone arrays included in the ADAs simultaneously and periodically.

As illustrated in FIG. 8, an ADA may measure $\tau$ during a first ON cycle (denoted as ON [1]). The acoustic signal emitted from an AA (e.g., sound waves from the AA 160 as shown in FIG. 7 above) is sensed after propagating for r seconds, but there is no way to distinguish the propagation time from the origination time. To resolve this issue, a measurement of r is made during a second ON cycle (denoted as ON [2]) to start the ON cycle. Minimum and maximum values of r may be identified according to system specifications and any measured delay should fit within that range. For instance, the maximum value for r may be based on the maximum sensing range of the system while the minimum value of r may be based on the sensitivity of the measurement device(s) (e.g., the microphone array included in each of the ADA(s) sensing the emitted acoustic signal(s)). Also illustrated in FIG. 8 is the ADA receiving the emitted acoustic signal by the attacker, after the propagation delay τ, and during each of the first and second ON cycles.

Figure 9:
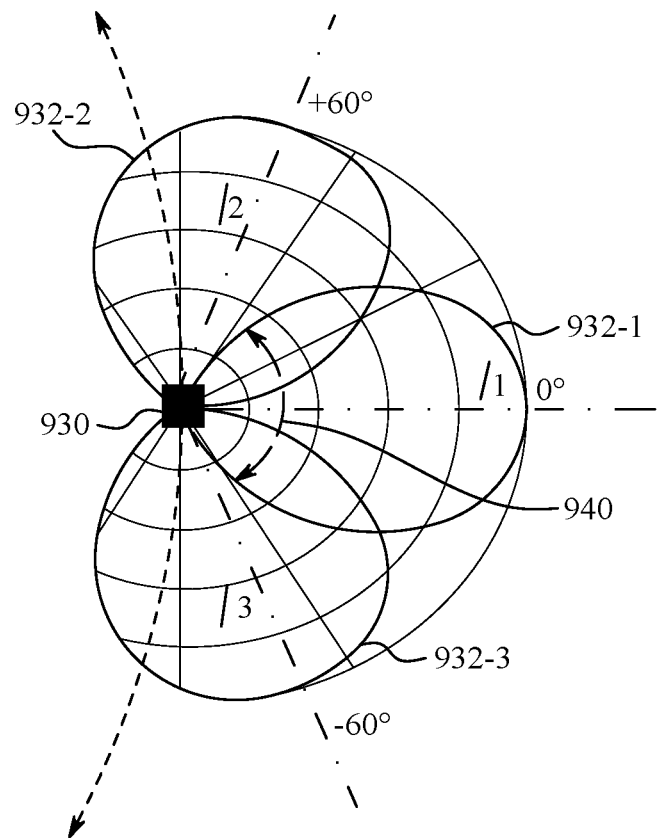
FIG. 9 depicts a representation by which an angle of arrival of an attacking agent is estimated, according to certain embodiments.

FIG. 9 depicts an example approach by which an angle of arrival (ω) may be estimated, according to various embodiments. The array of microphones, illustrated in FIG. 9, included in an ADA (e.g., ADA 930) has three loops, loop 1 (932-1), loop 2 (932-2), and loop 3 (932-3) (collectively "the loops 932"), each separated by 60°. The angle of arrival is associated with the loop in which the strongest acoustic signal is received. For instance, if the strongest acoustic signal is sensed within loop 1 (i.e., the loop 932-1), an angle of arrival is estimated to be +60°. To associate the received acoustic signal to any of the loops, the ADA 930 may switch the power between the loops in an alternating fashion, thereby enabling the ADA 930 to determine which of the loops 932 is receiving the strongest signal (e.g., the signal having the highest power).

To improve the accuracy of the estimation of the angle of arrival, a greater number of loops may be included. These loops may be included by narrowing/decreasing the beam width 940 of any/all of the loops 932 of the microphone array. Decreasing the beam width of the loops 932 also serves to reduce interference between individual loops of the microphone array. In alternative embodiments, the angle of arrival can be detected using an electronically driven microphone pattern that scans all directions and associates the maximum received power of the signal to the angle at which the pattern was tilting toward at that time.

Figure 10:
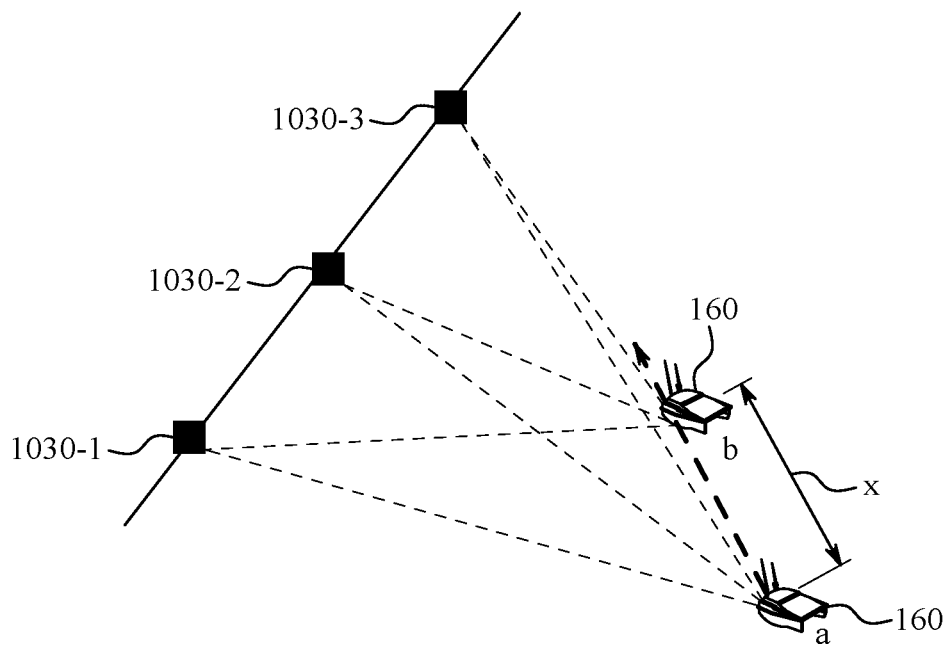
FIG. 10 illustrates determination, by a group of airborne defense agents, of the speed of an attacking agent, according to certain embodiments.

FIG. 10 illustrates an example approach for the determination by ADAs 1030-1, 1030-2, and 1030-3 (collectively "the ADAs 1030") of the speed of the AA 160, according to some embodiments. As shown in the figure, the AA 160 has traversed a distance x on its trajectory at a certain speed. By determining the distance x that the AA 160 has travelled between two detection times, the ADAs 1030 can determine the speed at which the AA 160 is travelling.

The distance x is the distance between two localization points, and is calculated by triangulating the position of the AA 160 at two consecutive instances of time. This calculation uses the propagation delay (τ) and an angle of arrival (ω) estimated by the ADAs 1030 and a second localization point being triangulated by the ADAs 1030. The first localization point is calculated by the ADAs 1030, as described above and below.

The localization points are measured according to a localization frequency VA which may equal 1/T in some embodiments. In this convention, T is approximately the time interval between a first localization point calculated at time $t_1$ and the second localization point calculated at time $t_2$, i.e., $T=t_2-t_1$. Thus, as $f_{lo}$ is the inverse of T, a higher localization frequency value reflects the system localizing the approaching AA more often than at a lower localization frequency. Upon configuring the system, T may be chosen and the distance x can be approximated as a straight line. Accordingly, the calculated values of distance x and $f_{lo}$ can be used to determine the speed, s, of the AA 160 by multiplying x by $f_{lo}$ ($s=xf_{lo}$). In some embodiments, the speed can be more accurately estimated by further averaging over consecutive segments.

Figure 11:
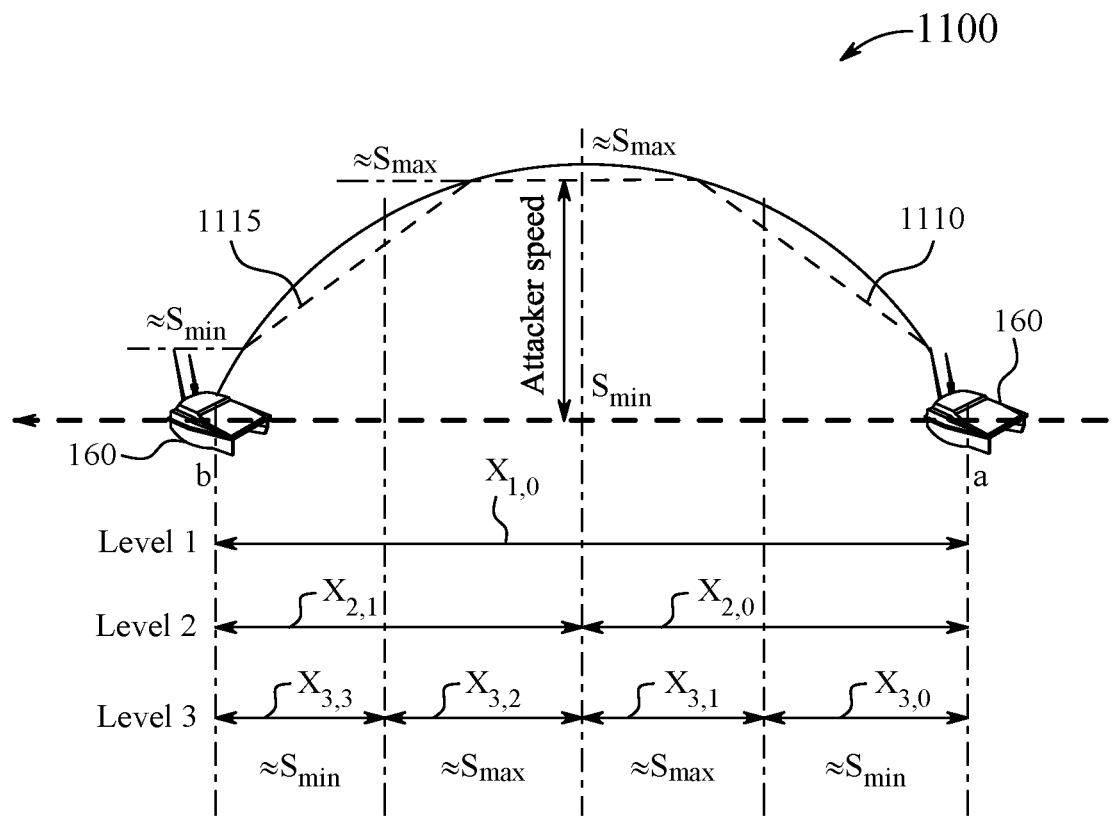
FIG. 11 represents a speed profile of an attacking agent, according to certain embodiments.

In accordance with the present disclosure, a speed profile, including a minimum speed $S_{min}$ and a maximum speed $S_{max}$ for an AA approaching a protected site may be constructed to reflect the change in speed of the approaching AA. Accuracy of the profiling is limited by the segmentation resolution—shorter segments can be used to determine more accurate profiling. An example of a speed profile 1100 is illustrated in FIG. 11. The speed profile 1100 can include an actual speed curve 1110 and a constructed speed curve 1115, each having plots at given points. The actual speed curve 1110 shows straight-line plots between measurements and the constructed speed curve 1115 smooths values between measurements. The speed profile may be used in estimating possible trajectories of an approaching AA.

An AA approaching a protected site may traverse a fixed trajectory. In accordance with the present disclosure, the speed profile 1100 includes a minimum speed ($S_{min}$) and a maximum speed ($S_{max}$) for an AA approaching a protected site. The speed profile 1100 may be constructed to reflect the change(s) in speed of the approaching AA as it travels along the trajectory as one of skill in the relevant art will recognize the speed can likely vary. To generate a speed profile for an approaching AA, the DAAUBS may vary the localization frequency of the ADAs. Varying the localization frequency can enable the DAAUBS to determine a maximum and a minimum speed for the approaching AA between two consecutive localization points over a given time interval, and to predict from the determination possible trajectories the approaching AA may follow.

In an example shown in FIG. 11, segment lengths are reduced as the assigned "level" of segmentation increases. Thus, according to the speed profile 1100 of the illustrated embodiment, level 2 segmentation can be produced using two segments ($x_{2,0}$ and $x_{2,1}$). If the speed is calculated over those two segments, equal values are derived from the equal but opposite curves of minimum to maximum to minimum values. However, if the segmentation is increased to "level 3" (i.e., four segments), calculating the speed over the various segments is not equal. The increase in segmentation makes clear that the speed over segments $x_{3,0}$ and $x_{3,3}$, which are segments accelerating from $S_{min}$, are lower than speeds over segments $x_{3,1}$ and $x_{3,2}$ (at least a portion of which each equal $S_{max}$). Thus, the level 3 profile can be more accurate and reflects the actual behavior of the UB to a greater degree. Use of these profiles in conjunction with machine learning will be given below with respect to FIGS. 15 and 16.

Figure 12:
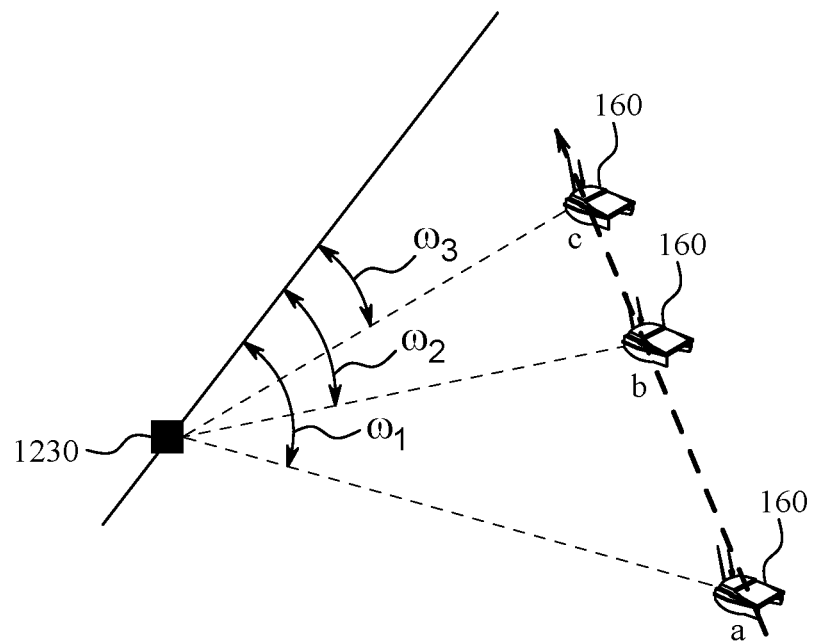
FIG. 12 illustrates a geometrical representation for processes used in estimating an attacking agent's speed relative to an ADA position, according to certain embodiments.

An example approach for estimating an attacker's speed relative to an ADA position is depicted in FIG. 12. The relative speed of the attacker can be calculated by observing the rate the angle of arrival changes per unit time. FIG. 12 shows that as the AA 160 moves on its trajectory (from a point a to a point b to a point c), the angle of arrival of corresponding sound signals change with respect to the ADA 1230's position. This difference, shown as values $ω_1$, $ω_2$, and $ω_3$ in FIG. 12, reflects the change. The relative speed calculated from these values can be incorporated toward understanding and predicting the trajectory of the attacker again addressed in further detail below.

Figure 13:
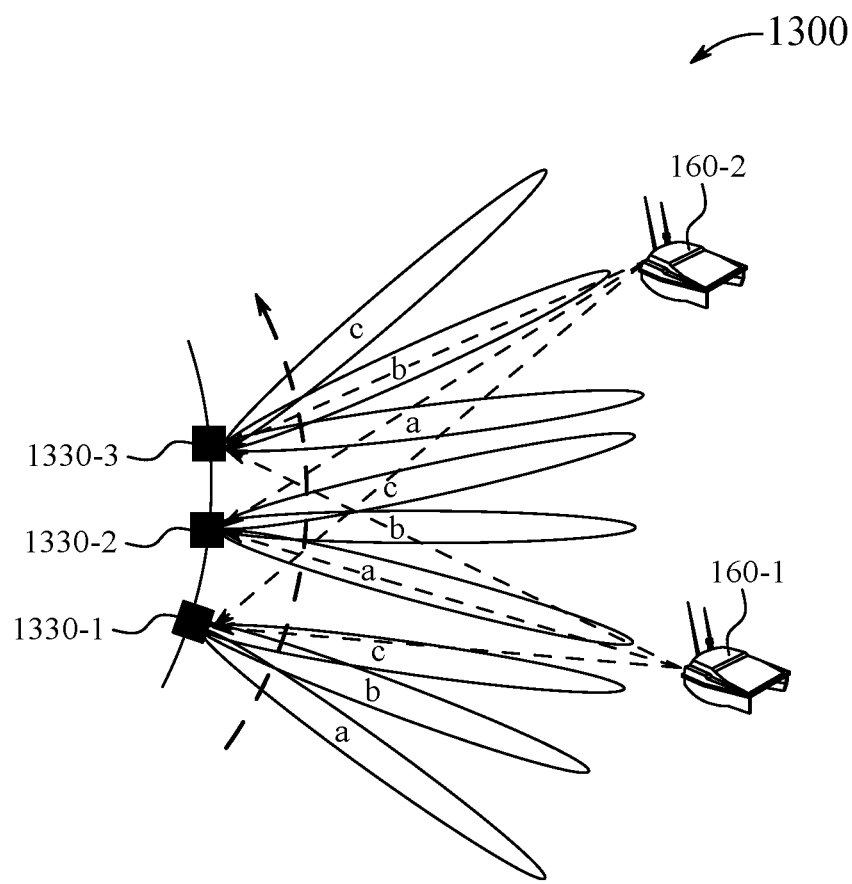
FIG. 13 shows an exemplary configuration for counting a number of attackers, according to certain embodiments.

In order for the DAAUBS 100 to accurately count the number of attackers/UBs approaching a site, the directional microphone array of each ADA can produce different loops, according to some embodiments. FIG. 13 depicts an exemplary configuration 1300 for counting a number of attackers, according to some embodiments. Each of the ADAs 1330-1, 1330-2, and 1330-3 (collectively "ADAs 1330") has a microphone array and each one generates loops, denoted as respective loops a, loops b, and loops c.

To count the number of approaching AAs, one loop per ADA at a time receives the acoustic signal with a highest power ($P_h$) emitted from an AA approaching a protected site. A second parameter can also be considered, a threshold α, which is compared against $P_h$ (i.e., $P_h > \alpha$). In some embodiments, the threshold α can be set experimentally, according to microphone sensitivity and range. In this manner the threshold α can be based on a minimum power that can be received by an ADA. As shown in the configuration 1300, two AAs, 160-1 and 160-2, are within the sensing range of the ADAs 1330.

A two-step process is used with the ADAs 1330 to associate attackers, first with an ADA and then with a specific loop of the associated ADA, according to various embodiments. For example, as shown in FIG. 13, none of the ADA 1330-1's loops intercept with the signal of AA 160-2. The AA 160-1 can only be sensed by ADAs 1330-1 and 1330-2, because none of the ADA 1330-3's loops intercept the signal.

In instances of two ADAs receiving the same signal strength (e.g., 160-1 as detected through loop c of ADA 1330-1 and loop a of ADA 1330-2), rules can be set to resolve the conflict. In some embodiments, if two ADAs receive a signal at the same power, the attacker is associated with the ADA with the loop having the lowest angle of arrival through which the signal is received. As shown in FIG. 13 and following this rule, the AA 160-1 is associated to loop a of ADA 1330-2. AA 160-2 will be sensed at ADA 1330-2 only through loop b. As for the example of attackers to count in FIG. 13, the DAAUBS 100 will count two UBs from the two associated ADA-loops.

Figure 14:
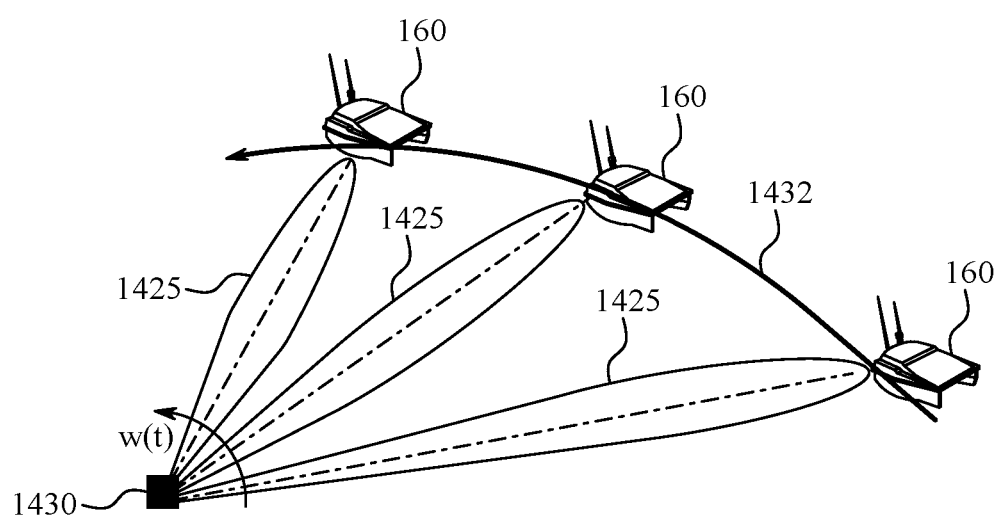
FIG. 14 depicts a tracking process to determine a direction of movement of an attacking agent, according to certain embodiments.

FIG. 14 depicts a tracking process to determine a direction of movement of an AA 160, according to some embodiments. The movement tracking process shown in FIG. 14 is a function realized by loop tracking. This process is achieved through forming a loop by the ADA's microphone array to track the movement of a potential attacker, such as a path 1432 shown in FIG. 14. An electronically controlled microphone pattern may be used that tracks the maximum received signal power by aligning the microphone's main loop, shown as a loop 1425 in FIG. 14, in the direction of the attacker. According to some embodiments, the accuracy of tracking is proportional to the agility of the ADA's loop alignment. Loop alignment is an empirical process using a trial-and-error approach to lock in the attacker.

Figure 15:
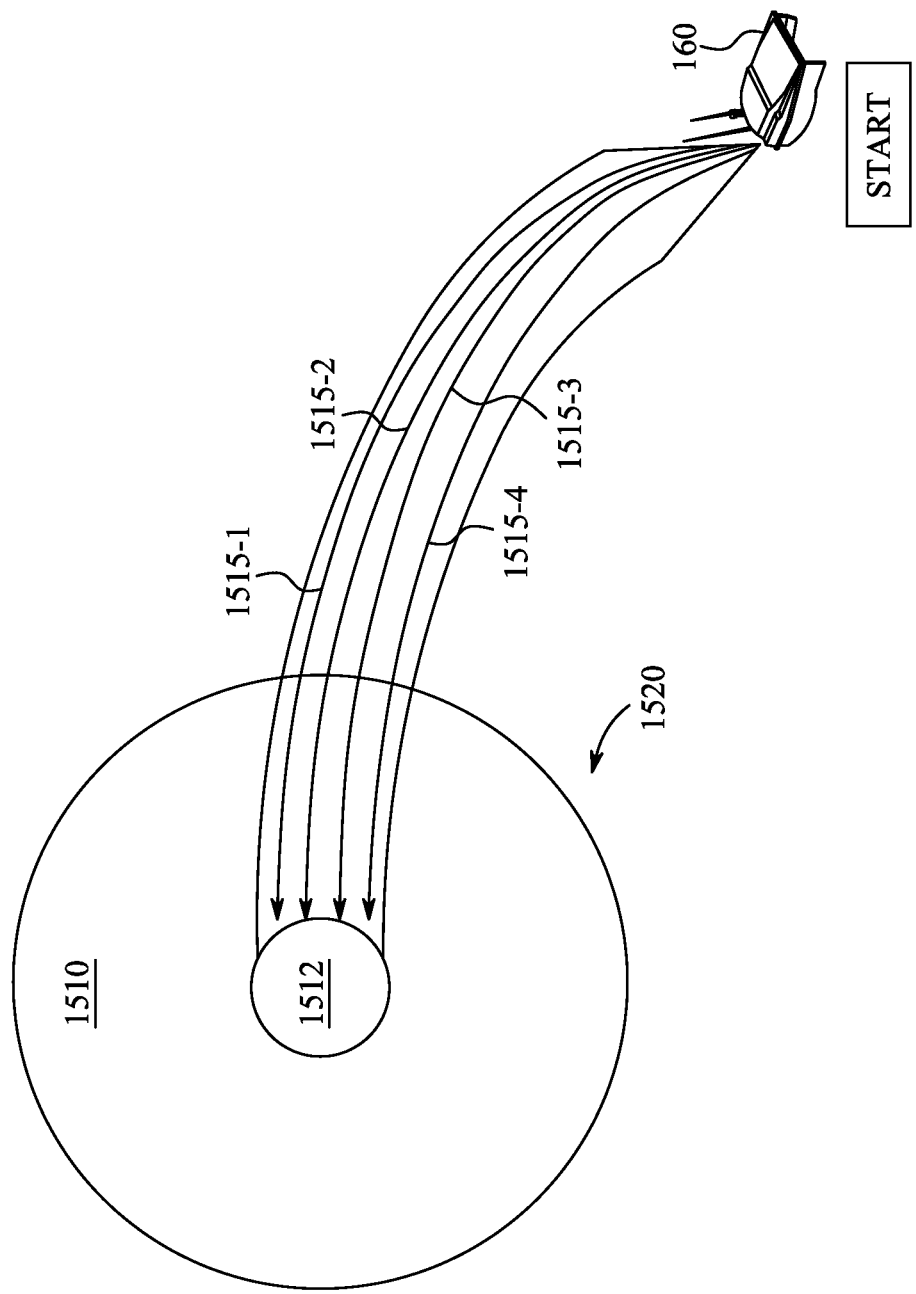
FIG. 15 illustrates examples of multiple trajectories an attacking agent may traverse while approaching a protected site, according to certain embodiments.

FIG. 15 illustrates multiple possible trajectories the attacking agent 160 may take while approaching the protected site 1510 or a high-sensitivity area 1512 within the protected site 1510, according to some embodiments. The multiple possible trajectories are denoted as trajectories 1515-1, 1515-2, 1515-3, and 1515-4 (collectively "the possible trajectories 1515"). The possible trajectories 1515 may be predicted, using machine learning algorithms executing on circuitry included at the BS-CC included in the protected site 1510 (e.g., BS-CC 140).

To predict the possible trajectories 1515 that the AA 160 may traverse while approaching the protected site 1510, the artificial intelligence may use the propagation delay of acoustic signals emitted from the AA 160, an angle(s) of arrival of the AA 160, a speed profile(s) of the AA 160, and/or a combination thereof. The speed profiles can be stored in a local or remote database and be similar to those outlined in FIG. 11 above. In addition to signals emitted from the AA 160, the artificial intelligence may also use one or more defined sets of rules related to aerodynamics, fluid dynamics, other physics properties, drone/UB type, and/or environmental information (such as salinity, temperature, etc.) to predict the possible trajectories 1515.

For example, a UB type may be known to have a certain maximum speed, and thus its trajectory can only reach certain coordinates within a given timeframe. Conversely, a certain speed profile may only be attributable to a certain vessel type, and other potential trajectories eliminated because of this specificity (such as fast-moving UB that is known to have a range capability too short to reach the protected site). As a more specific example, a protected site may be in very shallow water that a UB having a certain speed profile cannot reach because the UB requires deeper water to navigate successfully. Other examples of using these measurements and UB profiles with machine-learned prediction methods will be apparent to one of skill in computer sciences, machine learning, and predictive analytics.

FIG. 15 shows the general scope of the trajectory prediction processes, i.e., how the system must analyze gathered intelligence in order to compute all possible routes from its current position "start" point to points within the protected site 1510. The artificial intelligence can exclude all routes that do not cross the high-sensitivity area 1512 in order to optimize prediction processes in certain embodiments. The system can also conduct measurements of the attacker's coordinates while approaching the protection zone 1510. Those measurements can then be compared against the predicted coordinates in order to select one or more possible matching routes or to eliminate possible matching routes.

According to some embodiments, the analysis may be conducted via machine learning techniques such as regression analysis, model-based or model-free deep reinforcement learning, various forms of neural networks, other deep learning techniques or a combination thereof. Classifiers can be used to train data according to various embodiments, including support vector machines (SVM), a random forest (RF), a machine learning Dempster-Shafer (ML-DS) algorithm, long short-term memory (LSTM) algorithms, and Restricted Boltzmann Machines. Data for training can include profiles of known UBs, including sizes, ranges, speed profiles, acceleration characteristics, body types, propulsion systems, or other aspects of different vessels. Data for training can be included in a local or remote database using storage methods known to one of skill in the relevant arts.

Figure 16:
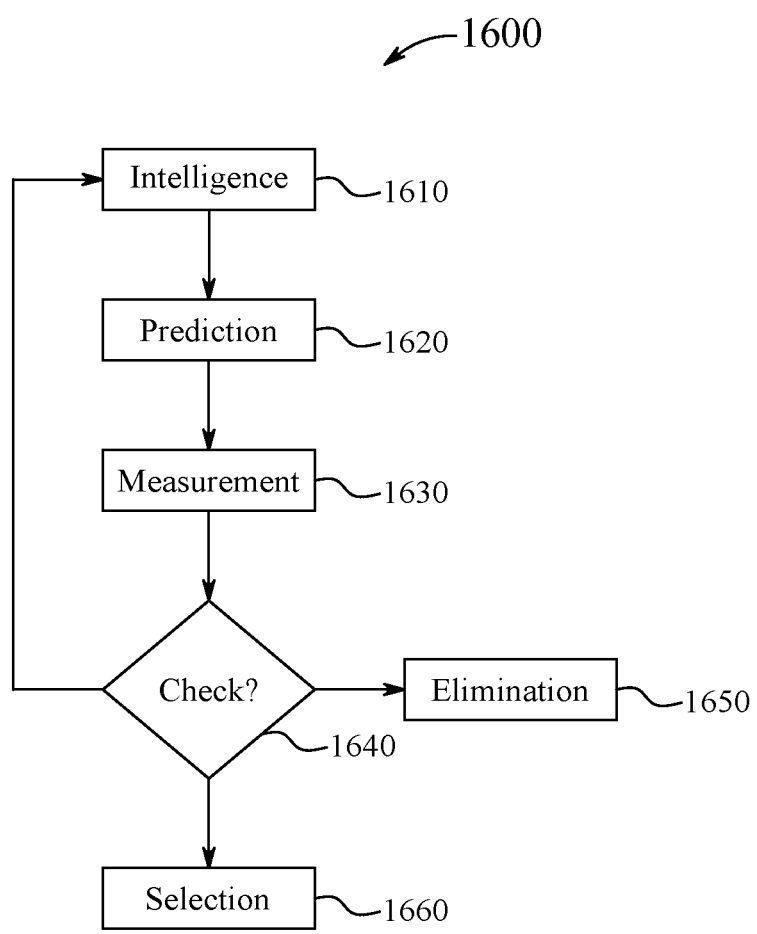
FIG. 16 depicts a framework of a prediction process, according to certain embodiments.

FIG. 16 shows an example framework of a prediction process 1600 where the system periodically checks predicted trajectories against a measured trajectory prior to selection of one or more most relevant and accurate predicted routes, according to some embodiments. At a step 1610, the intelligence for predicting possible trajectories is gathered, such as performing one or more of the detection steps found in the intelligence method 300 from the step 310 to the step 335. At a step 1620, a prediction is made such as those using one or more of the steps 340 to 370 described above for the method 300.

At a step 1630, subsequent measurements can be taken to track the actual behavior of a potential attacker/UB in relation to the predicted trajectory or trajectories. At a step 1640, a comparison is made to check if one or more of the predictions may still apply (i.e., if the movement of a potential attacker is within or outside of a predicted trajectory). If the comparison determines that one or more predicted trajectories can be eliminated, those predictions are discarded at a step 1650 so as to simplify subsequent possibilities and the process 1600 returns to the step 1610.

If the comparison cannot simplify the prediction at that point of measurement, the method also returns to the step 1610 to perform another iteration. However, if the comparison yields a specific trajectory, such as one that crosses the high-sensitivity area 1512 with a certain degree of certainty as shown in FIG. 15 above, the trajectory is selected at a step 1660. In this instance, the system can generate an alert, such as the one described above with respect to the step 375 of the method 300. The alert can be generated using audio, visual, and/or textual cues, or any combination thereof.

Figure 17:
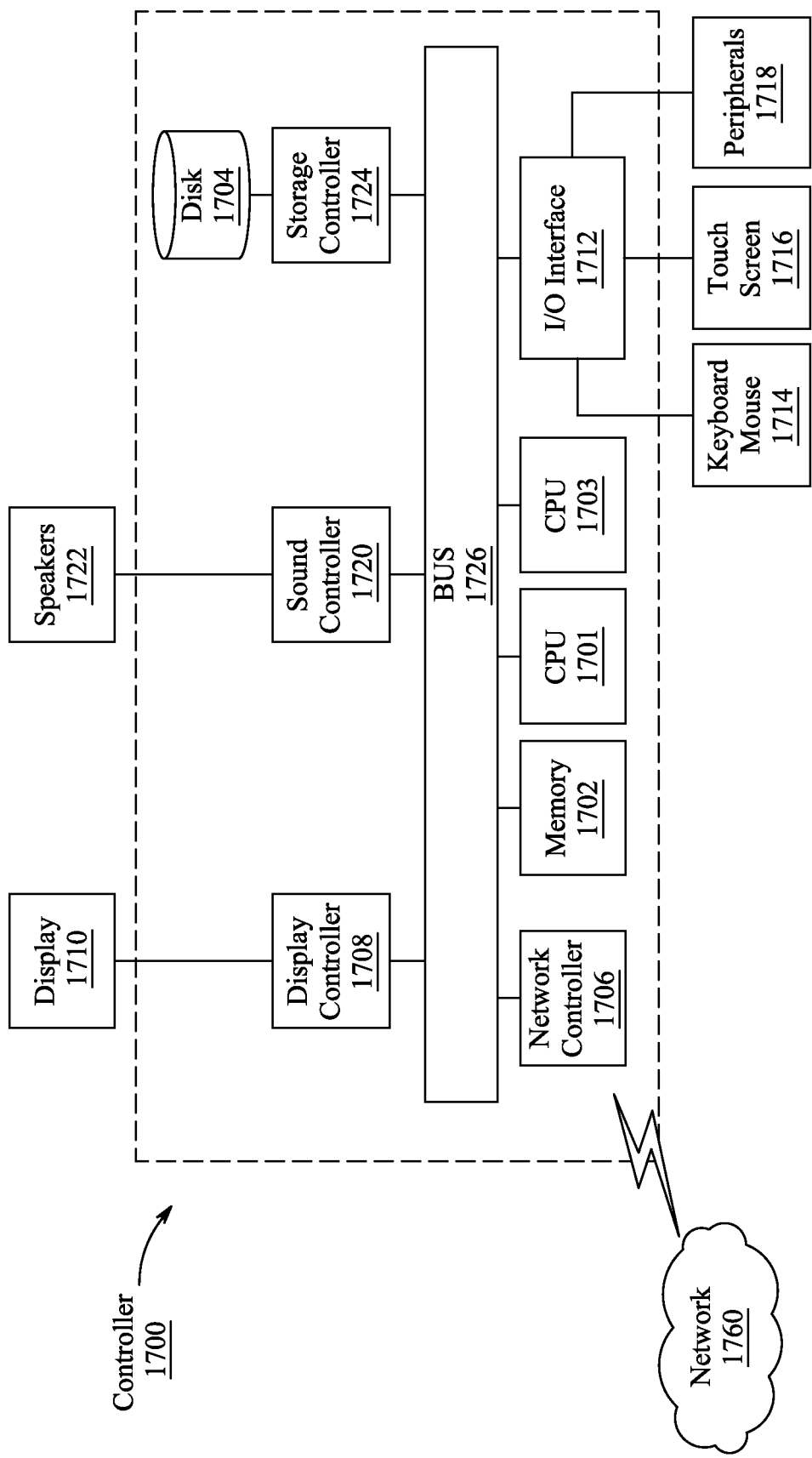
FIG. 17 is an illustration of a non-limiting example of details of computing hardware used in the computing devices, according to certain embodiments.

Next, further details of the hardware description of the computing environment of base station 140 according to exemplary embodiments is described with reference to FIG. 17. Some or all of the described elements may also be implemented in ADA 230. In FIG. 17, a controller 1700 is described is representative of the computer 142 of FIG. 1 in which the controller is a computing device which includes a CPU 1701 which performs the processes described above/below. The process data and instructions may be stored in memory 1702. These processes and instructions may also be stored on a storage medium disk 1704 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 1701, 1703 and an operating system such as Microsoft Windows 7, Microsoft Windows 10, UNIX, Solaris, LINUX, Apple MAC-OS and other systems known to those skilled in the art.

The hardware elements in order to achieve the computing device may be realized by various circuitry elements, known to those skilled in the art. For example, CPU 1701 or CPU 1703 may be a Xenon or Core processor from Intel of America or an Opteron processor from AMD of America, or may be other processor types that would be recognized by one of ordinary skill in the art. Alternatively, the CPU 1701, 1703 may be implemented on an FPGA, ASIC, PLD or using discrete logic circuits, as one of ordinary skill in the art would recognize. Further, CPU 1701, 1703 may be implemented as multiple processors cooperatively working in parallel to perform the instructions of the inventive processes described above.

The computing device in FIG. 17 also includes a network controller 1706, such as an Intel Ethernet PRO network interface card from Intel Corporation of America, for interfacing with network 1760. As can be appreciated, the network 1760 can be a public network, such as the Internet, or a private network such as an LAN or WAN network, or any combination thereof and can also include PSTN or ISDN sub-networks. The network 1760 can also be wired, such as an Ethernet network, or can be wireless such as a cellular network including EDGE, 3G, 4G and 5G wireless cellular systems. The wireless network can also be WiFi, Bluetooth, or any other wireless form of communication that is known.

The computing device further includes a display controller 1708, such as a NVIDIA GeForce GTX or Quadro graphics adaptor from NVIDIA Corporation of America for interfacing with display 1710, such as a Hewlett Packard HPL2445w LCD monitor. A general purpose I/O interface 1712 interfaces with a keyboard and/or mouse 1714 as well as a touch screen panel 1716 on or separate from display 1710. General purpose I/O interface also connects to a variety of peripherals 1718 including printers and scanners, such as an OfficeJet or DeskJet from Hewlett Packard.

A sound controller 1720 is also provided in the computing device such as Sound Blaster X-Fi Titanium from Creative, to interface with speakers/microphone 1722 thereby providing sounds and/or music.

The general-purpose storage controller 1724 connects the storage medium disk 1704 with communication bus 1726, which may be an ISA, EISA, VESA, PCI, or similar, for interconnecting all of the components of the computing device. A description of the general features and functionality of the display 1710, keyboard and/or mouse 1714, as well as the display controller 1708, storage controller 1724, network controller 1706, sound controller 1720, and general purpose I/O interface 1712 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 18.

Figure 18:
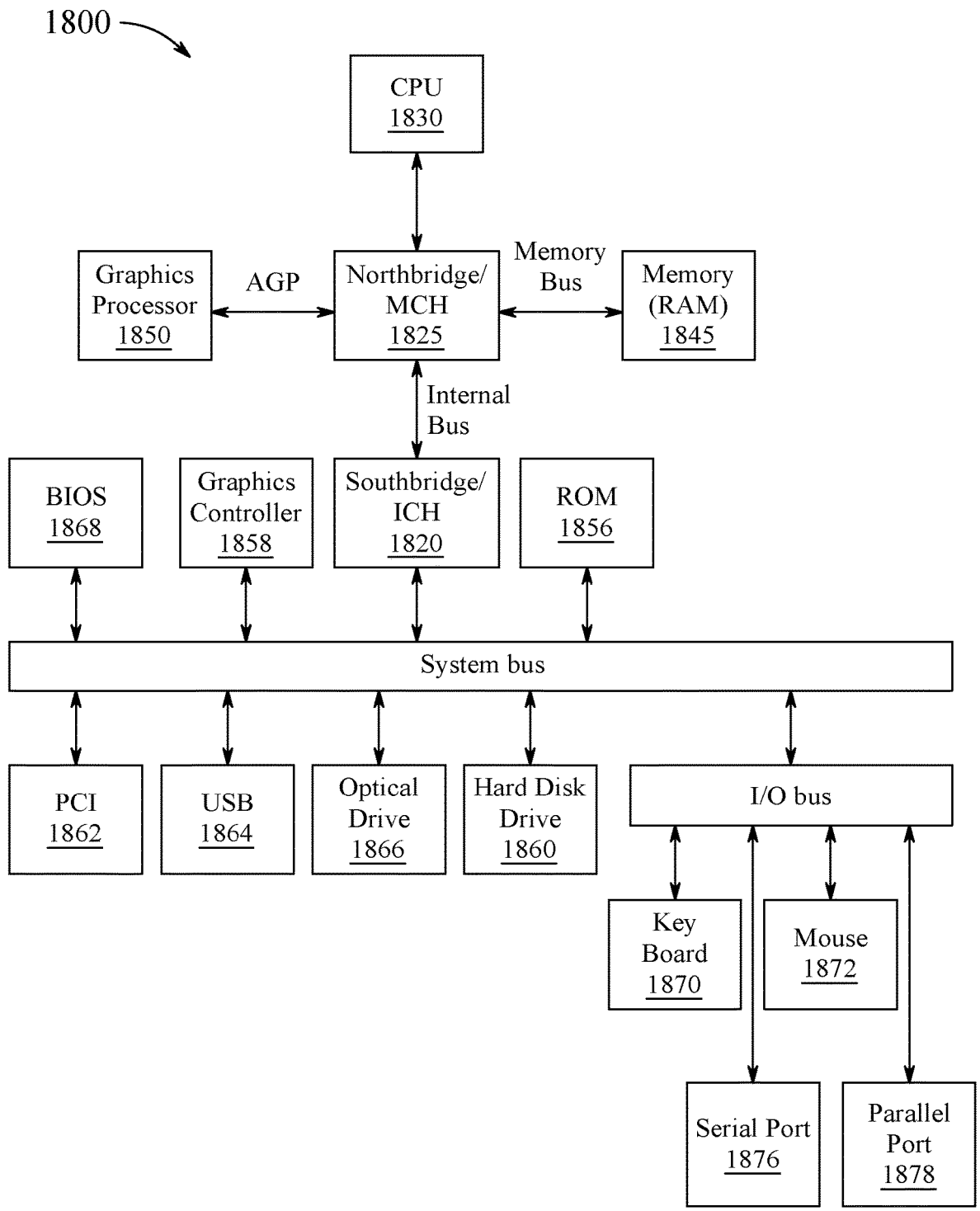
FIG. 18 is an exemplary schematic diagram of a data processing system used within the computing devices, according to certain embodiments.

FIG. 18 shows a schematic diagram of a data processing system, according to certain embodiments, for performing the functions of the exemplary embodiments. The data processing system is an example of a computer in which code or instructions implementing the processes of the illustrative embodiments may be located.

In FIG. 18, data processing system 1800 employs a hub architecture including a north bridge and memory controller hub (NB/MCH) 1825 and a south bridge and input/output (I/O) controller hub (SB/ICH) 1820. The central processing unit (CPU) 1830 is connected to NB/MCH 1825. The NB/MCH 1825 also connects to the memory 1845 via a memory bus, and connects to the graphics processor 1850 via an accelerated graphics port (AGP). The NB/MCH 1825 also connects to the SB/ICH 1820 via an internal bus (e.g., a unified media interface or a direct media interface). The CPU Processing unit 1830 may contain one or more processors and even may be implemented using one or more heterogeneous processor systems.

Figure 19:
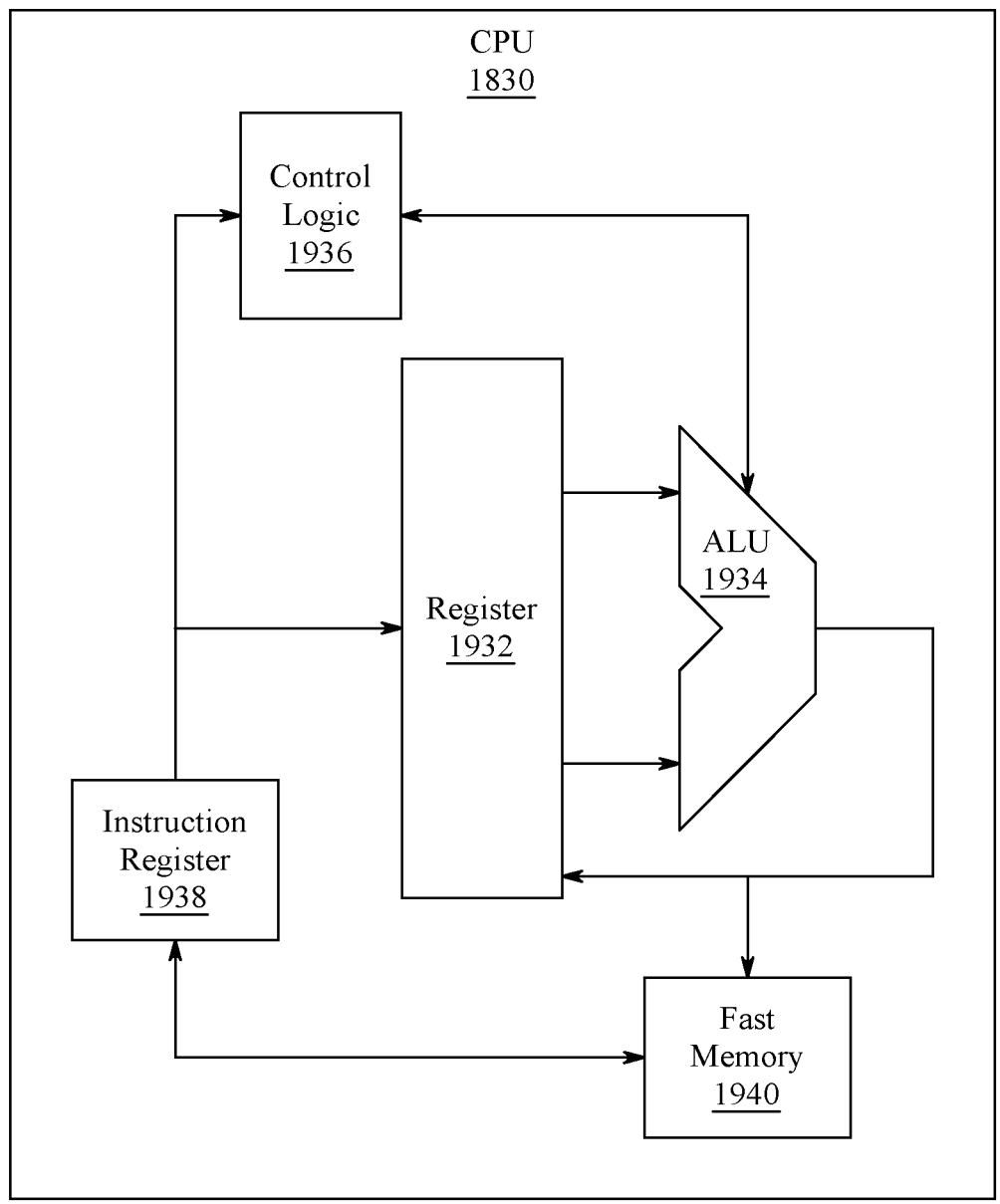
FIG. 19 is an exemplary schematic diagram of a processor used with the computing devices, according to certain embodiments.

For example, FIG. 19 shows one implementation of CPU 1830. In one implementation, the instruction register 1938 retrieves instructions from the fast memory 1940. At least part of these instructions are fetched from the instruction register 1938 by the control logic 1936 and interpreted according to the instruction set architecture of the CPU 1830. Part of the instructions can also be directed to the register 1932. In one implementation the instructions are decoded according to a hardwired method, and in another implementation the instructions are decoded according to a microprogram that translates instructions into sets of CPU configuration signals that are applied sequentially over multiple clock pulses. After fetching and decoding the instructions, the instructions are executed using the arithmetic logic unit (ALU) 1934 that loads values from the register 1932 and performs logical and mathematical operations on the loaded values according to the instructions. The results from these operations can be feedback into the register and/or stored in the fast memory 1940. According to certain implementations, the instruction set architecture of the CPU 1830 can use a reduced instruction set architecture, a complex instruction set architecture, a vector processor architecture, a very large instruction word architecture. Furthermore, the CPU 1830 can be based on the Von Neuman model or the Harvard model. The CPU 1830 can be a digital signal processor, an FPGA, an ASIC, a PLA, a PLD, or a CPLD. Further, the CPU 1830 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 18, the data processing system 1800 can include that the SB/ICH 1820 is coupled through a system bus to an I/O Bus, a read only memory (ROM) 1856, universal serial bus (USB) port 1864, a flash binary input/output system (BIOS) 1868, and a graphics controller 1858. PCI/PCIe devices can also be coupled to SB/ICH 1888 through a PCI bus 1862.

The PCI devices may include, for example, Ethernet adapters, add-in cards, and PC cards for notebook computers. The Hard disk drive 1860 and CD-ROM 1866 can use, for example, an integrated drive electronics (IDE) or serial advanced technology attachment (SATA) interface. In one implementation the I/O bus can include a super I/O (SIO) device.

Further, the hard disk drive (HDD) 1860 and optical drive 1866 can also be coupled to the SB/ICH 1820 through a system bus. In one implementation, a keyboard 1870, a mouse 1872, a parallel port 1878, and a serial port 1876 can be connected to the system bus through the I/O bus. Other peripherals and devices that can be connected to the SB/ICH 1820 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

Figure 20:
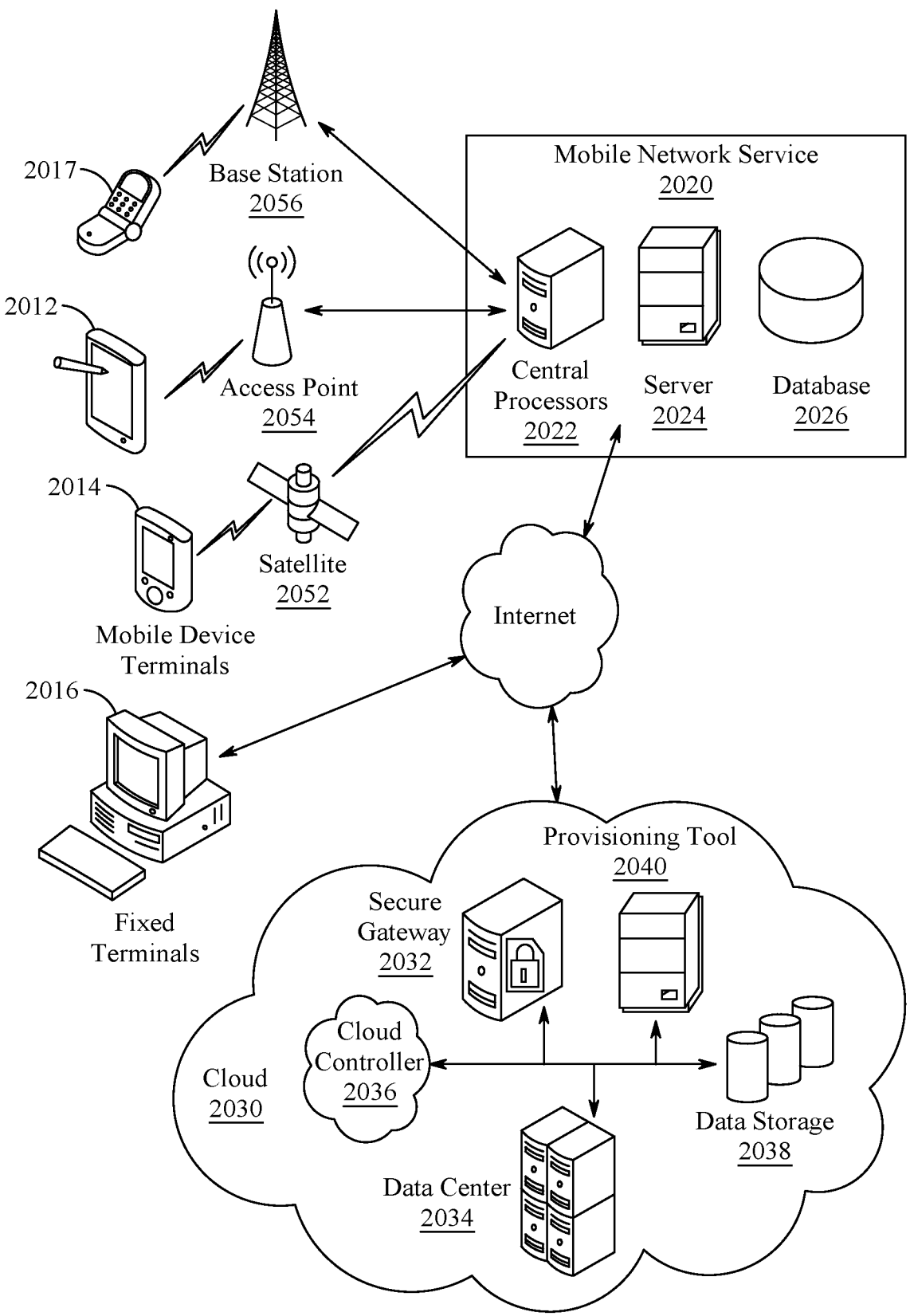
FIG. 20 is an illustration of a non-limiting example of distributed components which may share processing with the controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 20, in addition to various human interface and communication devices (e.g., cell phones 2011, personal digital assistants (PDAs) 2012, smart phones or mobile device terminals 2014, display monitors or fixed terminals 2016, tablets not shown or numbered). The network may be a private network, such as a LAN or WAN, or may be a public network, such as the Internet. Access may be through a satellite 2052, an access point 2054, or base station 2056, to a mobile network service 2020. The mobile network service 2020 can include central processor(s) 2022, server(s) 2024, or database(s) 2026. Input to the system may be received via direct user input and received remotely either in real-time or as a batch process. Back-end processing may be enabled by cloud services 2030, with the aid of one or more of secure gateway 2032, data center 2034, cloud controller 2036, data storage 2038, and/or provisioning tool 2040. Additionally, some implementations may be performed on modules or hardware not identical to those described. Accordingly, other implementations are within the scope that may be claimed.

The above-described hardware description is a non-limiting example of corresponding structure for performing the functionality described herein.

Obviously, numerous modifications and variations of the present disclosure are possible in light of the above teachings. It is therefore to be understood that within the scope of the appended claims, the invention may be practiced otherwise than as specifically described herein.

The invention claimed is:

1. A distributed acoustic anti-unmanned boat intelligence system (DAAUBS) for detecting at least one unmanned boat (UB) approaching a protected site, comprising:
    a plurality of airborne defense agents (ADAs), wherein each ADA is equipped with:
        a directional microphone array configured to detect acoustic signals emitted by a UB;
        a first computing device including first circuitry and a first computer-readable medium comprising first program instructions, executable by at least one first processor, to cause the at least one first processor to determine a direction and a distance of each approaching UB from the ADA;
        a transceiver;
    a plurality of buoys, each buoy located at a fixed radius from the protected site and equidistant from each other buoy;
    a plurality of tethers, each rope of length L, wherein a top portion of each buoy is connected to one of the plurality of tethers;
    a plurality of air balloons, each air balloon having a lower mount attached to the tether; and
    wherein each air balloon is configured to hold the first computing device and the directional microphone array of an ADA at a fixed height L+H above the buoy, where fixed H is a distance of the directional microphone array from the lower mount parallel to an axis of the tether;
    a base station configured with a wideband communications link to communicate with the transceiver of each ADA and the protected site;
    a DAAUBS control center located within the base station and configured with a wideband communications link configured to communicate with the transceiver of each ADA and the protected site, the DAAUBS control center including a second computing device having a second circuitry and second computer-readable medium comprising program instructions, executable by at least one second processor, to cause the at least one second processor to:
        receive the direction and a distance of each approaching UB from the ADA;
        aggregate the directions and distances of the approaching UBs;
        perform adaptive noise cancellation on the aggregated directions and distances to remove environmental background noise;
        apply each direction and distance to a deep learning classifier trained to classify at least one of a type and size of the UB based on its acoustic signature;
        predict a route of each approaching UB towards the protected site; and
        alert the protected site of the predicted route and at least one of a type and size of each approaching UB.

2. The distributed acoustic anti-unmanned boat intelligence system of claim 1, further comprising:
   wherein the first computing device includes switching circuitry configured to switch a power of each directional microphone ON and OFF in an alternating sequence; and
   wherein the second processing circuitry is configured to transmit control signals to the ADAs to switch the directional microphone arrays ON and OFF simultaneously.

3. The distributed acoustic anti-unmanned boat intelligence system of claim 2, wherein the first computing device of each ADA further comprises:
   a frequency analyzer configured to determine a frequency of an acoustic signal emitted by a UB;
   a power meter configured to measure the amplitude of the acoustic signal;
   a synchronization circuit configured to generate square waves to operate the frequency analyzer; and
   a timer connected to the power meter and configured to set a timing of the alternating sequences for switching the directional microphones ON and OFF.

4. The distributed acoustic anti-unmanned boat intelligence system of claim 1, wherein the second circuitry of the second computing device further comprises a plurality of adaptive filters configured to perform the adaptive noise cancellation.

5. The distributed acoustic anti-unmanned boat intelligence system of claim 4, wherein the second computing device further includes:
   a database configured with data including known sizes and known types of UBs, and specifications regarding the known sizes and known types of the UBs and the speed and maneuverability of each known size and known type of UB; and
   wherein the deep learning classifier is trained on the data.

6. The distributed acoustic anti-unmanned boat intelligence system of claim 5, further comprising:
   wherein the at least one first processor is configured to convert the acoustic signals from a time domain to a frequency domain, identify a set of frequency components, and estimate the distance to each approaching UB.

7. The distributed acoustic anti-unmanned boat intelligence system of claim 6, further comprising:
   wherein each directional microphone of the directional microphone array is oriented to receive acoustic signals from a different angle;
   wherein the first computing device is configured to measure an amplitude, A, of each acoustic signal during the alternating ON periods, determine the angle of the directional microphone receiving a highest amplitude acoustic signal, and orient the directional microphone array to receive acoustic signals at the angle receiving the highest amplitude acoustic signal;
   wherein each at least one first processor is configured to:
   detect an angle of arrival, $\omega$, of the acoustic signal from the angle of the directional microphone receiving the highest amplitude; and
   estimate the distance between each ADA and a UB by measuring a propagation delay, $\tau$, of the acoustic signal having the highest amplitude.

8. The distributed acoustic anti-unmanned boat intelligence system of claim 7, further comprising:
   wherein the at least one second processor includes a machine learning processor configured to predict the route of an approaching UB by triangulating the acoustic signals received by the directional microphone arrays of three equidistant ADAs.

9. The system of claim 8, further comprising:
   wherein the at least one second processor is further configured to estimate the speed of the approaching UB by subtracting the distances measured by each of three equidistant ADAs at a first ON period from the distances measured at a second ON period, and dividing the difference by the time between the first ON period and the second ON period.

10. The system of claim 9, wherein:
    the deep learning classifier is selected from a group including support vector machines (SVM), a random forest (RF), a machine learning Dempster-Shafer (ML-DS) algorithm, long short-term memory (LSTM) algorithms, and Restricted Boltzmann Machines; and
    the machine learning processor is selected from a group including regression analysis, model-based deep reinforcement learning, model-free deep reinforcement learning, a deep neural network, a feedforward neural network, a deep belief network, a recurrent neural network, a convolutional deep neural network, other deep learning techniques, or a combination thereof.

11. A distributed acoustic anti-unmanned boat intelligence method (DAAUBS) for detecting at least one unmanned boat (UB) approaching a protected site, comprising:
    tethering each of a plurality of air balloons each supporting an airborne defense agent (ADA), to one of a plurality of buoys located at a fixed radius from the protected site and equidistant from each other buoy;
    switching each directional microphone of a directional microphone array of each airborne defense agent (ADA) ON and OFF during consecutive time periods in which only one directional microphone is ON in a time period;
    orienting each directional microphone of the directional microphone array of each ADA to receive acoustic signals from a different angle;
    detecting acoustic signals generated by UBs approaching the protected site during consecutive ON periods;
    measuring, by a first processing circuitry of each ADA, an amplitude, A, of each acoustic signal during the consecutive ON periods;
    detecting a directional microphone which receives a greatest amplitude of acoustic signal;
    detecting an angle of arrival, $\omega$, of the acoustic signal based on the angle of the directional microphone receiving the greatest amplitude; and
    estimating a first angle of approach, $\varphi_1$, and a first distance of each approaching UB from each ADA by measuring a propagation delay, $\tau$, of the acoustic signal having the greatest amplitude, during the first time period;
    estimating a second angle of approach, $\varphi_2$, and a second distance of each approaching UB from each ADA during the second time period;
    transmitting the first estimated angle of approach, first distance, the second estimated angle of approach, the second distance, first time period and second time period from each ADA to a DAAUB S control center;
    receiving, by a receiver of the DAAUBS control center, the first estimated angle of approach, first distance, the second estimated angle of approach, the second distance, first time period and second time period from each ADA;
    estimating, by a second processing circuitry of the DAAUBS control center, a speed of each UB by subtracting the distance estimated during a first ON time period from the distance measured during a second ON time period for each of three equidistant ADAs and dividing by the difference between the first and second time periods;

aggregating the angles of approach, distances and speeds of the approaching UBs to predict routes towards the protected site;

applying each direction, distance and speed to a deep learning classifier trained to classify at least one of a type and size of each approaching UB based on its acoustic signature; and transmitting an alert by the DAAUBS control center to the protected site when the route of at least one approaching UB intersects with the protected site.

12. The distributed acoustic anti-unmanned boat intelligence method of claim 11, further comprising:

transmitting control signals from the DAAUBS control center to each ADA to switch each directional microphone array ON to start detecting acoustic signals or OFF to sleep based on a number of the approaching UBs and the angle, w, of approach of each UB.

13. The distributed acoustic anti-unmanned boat intelligence method of claim 12, further comprising:

estimating the distance to an approaching UB from the ADA by converting, by the second processing circuitry, the acoustic signals of each approaching UB from the time domain to the frequency domain;

performing adaptive noise cancellation on the acoustic signals;

identifying a set of frequency components;

estimating the distance from the set of frequency components.

14. The distributed acoustic anti-unmanned boat intelligence method of claim 13, further comprising:

orienting each directional microphone of the directional microphone array of an ADA to receive acoustic signals from a different angle;

measuring, by the first processing circuitry, an amplitude, A, of each acoustic signal during the alternating ON periods;

detecting an angle of arrival, $\omega$, of the acoustic signal from the angle of the directional microphone receiving the greatest amplitude; and estimating the distance between each ADA and a UB by measuring a propagation delay, $\tau$, of the acoustic signal having the greatest amplitude.

15. The distributed acoustic anti-unmanned boat intelligence method of claim 14, further comprising:

predicting, by the second processing circuitry, the route of an approaching UB by triangulating the acoustic signals received by the directional microphone arrays of three equidistant ADAs.

16. The distributed acoustic anti-unmanned boat intelligence method of claim 15, further comprising:

applying, by the second processing circuitry, the aggregated angles of approach, distances and speeds of the approaching UBs to a machine learning processor to predict the route of each of the approaching UBs.

17. The distributed acoustic anti-unmanned boat intelligence method of claim 16, further comprising including the size, type, speed, distance and route of each approaching UB in the alert when the route is predicted to intersect with the protected site.

18. The distributed acoustic anti-unmanned boat intelligence method of claim 17, further comprising:

training the deep learning classifier to recognize a size and type of each UB by applying data including known sizes and known types of UBs, and specifications regarding the known sizes and known types of the UBs and the speed and maneuverability of each known size and known type of UB to the deep learning classifier.

19. A non-transitory computer readable medium having instructions stored therein that, when executed by one or more processors, cause the one or more processors to perform a for detecting at least one unmanned boat (UB) approaching a protected site, comprising:

tethering each of a plurality of air balloons each supporting an airborne defense agent (ADA), to one of a plurality of buoys located at a fixed radius from the protected site and equidistant from each other buoy;

switching each directional microphone of a directional microphone array of each airborne defense agent (ADA) ON and OFF during consecutive time periods in which only one directional microphone is ON in a time period;

orienting each directional microphone of the directional microphone array of each ADA to receive acoustic signals from a different angle;

detecting acoustic signals generated by UBs approaching the protected site during consecutive ON periods;

measuring, by a first processing circuitry of each ADA, an amplitude, A, of each acoustic signal during the consecutive ON periods;

detecting a directional microphone which receives a greatest amplitude of acoustic signal;

detecting an angle of arrival, $\omega$, of the acoustic signal based on the angle of the directional microphone receiving the greatest amplitude; and estimating a first angle of approach, $\varphi_1$, and a first distance of each approaching UB from each ADA by measuring a propagation delay, $\tau$, of the acoustic signal having the greatest amplitude, during the first time period;

estimating a second angle of approach, $\varphi_2$, and a second distance of each approaching UB from each ADA during the second time period;

transmitting the first estimated angle of approach, first distance, the second estimated angle of approach, the second distance, first time period and second time period from each ADA to a DAAUB S control center;

receiving, by a receiver of the DAAUBS control center, the acoustic signals, the first estimated angle of approach, first distance, the second estimated angle of approach, the second distance, first time period and second time period from each ADA;

performing adaptive noise cancellation on the acoustic signals;

estimating, by a second processing circuitry of the DAAUBS control center, a speed of each UB by subtracting the distance estimated during a first ON time period from the distance measured during a second ON time period for each of three equidistant ADAs and dividing by the difference between the first and second time periods;

aggregating the angles of approach, distances and speeds of the approaching UBs to predict routes towards the protected site;

applying each direction, distance and speed to a deep learning classifier trained to classify at least one of a type and size of each approaching UB based on its acoustic signature; and transmitting an alert by the DAAUBS control center to the protected site when the route of at least one approaching UB intersects with the protected site.

20. The non-transitory computer readable medium method of claim 19, further comprising:

training the deep learning classifier to recognize a size and type of each UB by applying data including known sizes and known types of UBs, and specifications regarding the known sizes and known types of the UBs and the speed and maneuverability of each known size and known type of UB to the deep learning classifier.

\* \* \* \* \*